United States Patent
Wattenburg

(10) Patent No.: US 10,049,776 B2
(45) Date of Patent: Aug. 14, 2018

(54) COMPRESSED AIR, UTILITY-SCALE, NON-POLLUTING ENERGY STORAGE AND NUCLEAR REACTOR EMERGENCY COOLING SYSTEM USING THERMAL POWER PLANT WASTE HEAT

(71) Applicant: Willard Harvey Wattenburg, Chico, CA (US)

(72) Inventor: Willard Harvey Wattenburg, Chico, CA (US)

( * ) Notice: Subject to any disclaimer, the term of this patent is extended or adjusted under 35 U.S.C. 154(b) by 0 days.

(21) Appl. No.: 15/242,350

(22) Filed: Aug. 19, 2016

(65) Prior Publication Data

US 2017/0186503 A1  Jun. 29, 2017
US 2017/0287576 A2  Oct. 5, 2017

Related U.S. Application Data

(63) Continuation-in-part of application No. 14/243,302, filed on Apr. 2, 2014, now Pat. No. 9,852,819.
(Continued)

(51) Int. Cl.

| | |
|---|---|
| *G21C 9/00* | (2006.01) |
| *G21C 15/18* | (2006.01) |
| *F01D 15/10* | (2006.01) |
| *F01D 25/08* | (2006.01) |
| *G21C 15/253* | (2006.01) |

(52) U.S. Cl.
CPC ........... *G21C 15/182* (2013.01); *F01D 15/10* (2013.01); *F01D 25/08* (2013.01); *G21C 15/253* (2013.01); *F05D 2220/70* (2013.01); *F05D 2260/213* (2013.01); *G21C 2015/185* (2013.01); *G21Y 2002/50* (2013.01); *G21Y 2004/30* (2013.01)

(58) Field of Classification Search
CPC .............. G21C 15/18; G21C 15/182; G21C 2015/185; G21C 2015/187
See application file for complete search history.

(56) References Cited

U.S. PATENT DOCUMENTS

| | | |
|---|---|---|
| 4,100,745 A | 7/1978 | Gyamathy |
| 5,085,825 A | 2/1992 | Gluntz et al. |
| (Continued) | | |

OTHER PUBLICATIONS

American Nuclear Society Special Committee on Fukushima Fukushima Accident 2011 Mar. 2012 http://fukushima.ans.org/.
(Continued)

*Primary Examiner* — Marshall P O'Connor
(74) *Attorney, Agent, or Firm* — David Pressman

(57) ABSTRACT

Modifications to power plants for moderating climate warming and increasing safety combine a large compressed air energy storage (CAES) system with a thermal power plant such that free power plant waste heat replaces natural gas used at existing and planned CAES facilities. The system allows higher percentages of wind and solar energy on existing grids. The compressed air in a companion CAES can cool a nuclear reactor during an emergency. Also an inexpensive, add-on, external, Emergency Core Cooling System (ECCS) can cool a nuclear reactor after shutdown, even when all internal cooling water circulation has been disabled. All embodiments are installed outside the plant where they will not be damaged in the event of a plant accident. Both systems use environmentally friendly compressed air energy storage in new ways, and can be built and installed quickly around the world at existing plants using only proven infrastructure.

13 Claims, 13 Drawing Sheets

Related U.S. Application Data

(60) Provisional application No. 61/930,369, filed on Jan. 22, 2014.

(56) References Cited

U.S. PATENT DOCUMENTS

| | | |
|---|---|---|
| 5,537,822 A | 7/1996 | Shnaid et al. |
| 7,873,136 B2 | 1/2011 | Meseth |
| 8,045,671 B2 | 10/2011 | Meseth |
| 8,347,628 B2 | 1/2013 | Gerard |
| 8,559,583 B1 | 10/2013 | Sato |

OTHER PUBLICATIONS

Hansen James et al. Climate Change Experts Endorse Nuclear Power World Nuclear News Nov. 4, 2013 http://www.world-nuclear-news.org/EE-Nuclear-essential-for-climate-stability-0411137.html.

CAES Compressed Air Energy Systems http://en.wikipedia.org/wiki/Compressed_air_energy_storage Huntorf Germany 290 MW CAES 1978 McIntosh Alabama 110MW CAES 1991.

Westinghouse Electric Co LLC The AP1000 Nuclear Plant Design http://ap1000.westinghousenuclear.com/index.html Cranberry Township PA USA.

U.S. Nuclear Regulatory Commission AP1000 Safety Evaluation Report NUREG-1793 Sep. 2011 ( http://www.nrc.gov/reactors/new-reactors/design-cert/ap1000.html.

Thermal Power Station https://en.wikipedia.org/wiki/Thermal_power_station#Superheater Wikipedia.

Figure 8--THE NCAP ENERGY STORAGE

MULTI-STAGE HEAT EXCHANGER AND AIR TURBINE

Figure 10—THE NCAP ENERGY STORAGE WITH COMBINED TURBINE AND GENERATOR

COMPRESSED AIR, UTILITY-SCALE, NON-POLLUTING ENERGY STORAGE AND NUCLEAR REACTOR EMERGENCY COOLING SYSTEM USING THERMAL POWER PLANT WASTE HEAT

CROSS-REFERENCE TO RELATED CASE

This application is a Continuation-In-Part of applicant's Parent application Ser. No. 14/243,302, Filed 2014 Apr. 2, now U.S. Pat. No. 9,852,819, granted 2017 Dec. 26. This Parent Application claims priority of applicant's provisional patent application, Ser. No. 61/930,369, filed 2014 Jan. 22.

BACKGROUND

Abbreviations

The following abbreviations are used in this patent and are defined in situ at the first use but are also all defined here for ready reference.

CAES Compressed Air Energy Storage
CG Compressed Gas
CGES Compressed Gas over Water Emergency Reactor Cooling System
CGECCS compressed gas emergency core cooling system
$CO_2$ Carbon Dioxide
DPCS Prior-Art Depressurization and Cooling System
GJ GigaJoules
HOE Heat Of Expansion For Compressed Air
MJ MegaJoules
MW MegaWatts
MWH MW Hours
NCAP Nuclear Compressed Air Power (combined thermal power plant and a CAES facility)
PCV Primary Containment Vessel
PSI Pounds Per Square Inch
RES Renewable Energy Storage
RPV Reactor Pressure Vessel
RRTC Railroad Tank Car
SCRAM An emergency shutdown of an operating nuclear power plant ("Safety Control Rod Axe Man")
SFP Spent Fuel Pool
TPP Thermal Power Plant
WHF Waste heat fluid from a thermal power plant

Prior-Art Compressed Air Energy Storage and Emergency Core Cooling Systems for Nuclear Plants Climate warming of the planet has become a serious problem in recent years. Such warming has caused glaciers to melt, raising the ocean levels and flooding coastal areas and ocean islands. The warming has been attributed, inter alia, to the increase of carbon dioxide ($CO_2$) levels in the atmosphere. Thus moderating climate warming will require the replacement of many fossil fuel power plants with renewable energy sources that emit no $CO_2$. However, most of the world's available wind, solar, and tidal energy cannot be utilized because there is no way to store most of the available renewable energy until it is needed on a power grid. Hence, an important physical infrastructure needed to moderate climate warming is an inexpensive, utility-scale, renewable energy storage (RES) design that can be installed on electrical grids all over the world. A desirable "utility-scale" design would be an affordable facility which can store at least 2000 megawatt-hours (MWH) of energy and can generate at least 200 MW of power on short notice.

The largest utility-scale compressed air energy storage (CAES) facilities in existence are compressed air energy storage (CAES) facilities in McIntosh, Ala., and Huntorf, Germany. These CAES systems have been in operation for decades. Although desirable for storing energy, these old-style CAES facilities have not been copied around the world because it is expensive to recover and utilize their stored energy. Specifically when the stored compressed air is to be used, it must be expanded from a highly compressed level, e.g., 1000 psi or 70 bar (1 bar=atmospheric pressure or 14.7 psi) to ambient pressure. But when isothermal gas is partially expanded in an air turbine or motor its temperature drops substantially such that it will freeze equipment in contact. Complete expansion requires the addition of heat energy to the compressed air. This is called the "heat of expansion" (HOE). In the present old-style CAES facilities, large amounts of natural gas are burned to provide the HOE so that the stored compressed air can expand to a lower pressure and drive a turbine or air motor to produce electrical power. The amount of HOE needed by a CAES system can be as much as 30% of the energy output of the CAES facility.

In addition to the expense of the natural gas, these old style CAES systems produce substantial $CO_2$ emissions when they burn the natural gas or any other fossil fuel. An energy storage facility that puts large amounts of $CO_2$ in the atmosphere defeats the purpose of generating and capturing renewable wind and solar energy.

SUMMARY

The NCAP system utilizes the abundant (free) waste heat from any standard thermal power plant (TPP) to replace the costly and polluting natural gas that is used to heat the compressed air in existing and planned old-style CAES facilities. This heat energy transferred to the compressed air is called the "heat of expansion" (HOE). The operating cost reduction and elimination of $CO_2$ emissions justify connecting a CAES facility and an existing TPP plant to implement the NCAP system. All prior CAES systems use an expensive additional heat source for the HOE.

Potential underground air reservoir sites exist near many TPP power plants at all latitudes around the world. It has been estimated that underground CAES air reservoirs could be located under 80% of the land area of the U.S. That means there can be CAES facilities near many of the thousands of thermal power plants around the world. And, as explained herein, the CAES storage facility can be many miles distant from its companion TPP power plant in the NCAP system.

In the NCAP system, a TPP power plant and a CAES are connected by a relatively inexpensive heat exchanger so that some of the free waste heat generated by the TPP plant is transferred to the compressed air coming out of the CAES reservoir. The heated compressed air then drives an air turbine or motor to generate electricity. The heat exchanger required is similar to the heat exchangers used at all thermal power plants and in other inventions cited above. In the NCAP system, the additional heat exchanger simply transfers some of the TPP waste heat to the compressed air instead of throwing all of the TPP waste heat into the environment. Some of the waste heat formally thrown away is transferred to the compressed air and converted into useful power when the heated compressed air drives a turbine.

The TPP power plant in the NCAP system can be a fossil fuel, nuclear, biomass, geothermal, or solar-thermal power plant. The waste heat generated and released to the environment by a TPP plant is conveyed by a waste heat fluid (WHF) such as steam/hot water, hot exhaust gases from a gas turbine, or molten metal that stores energy. Forty to sixty percent of the thermal energy generated in a TPP plant is waste heat. Ninety percent of the power plants in the world are steam generating (TPP) power plants. More thermal energy is thrown into the environment than is converted into useful power. In fact, the amount of waste heat generated by thermal power plants is many times the total amount of renewable energy being captured on the electrical grids of the world today. The NCAP system described herein simply combines these two huge untapped or lost sources of energy to provide significantly more useful power on electrical grids.

Advantages

The NCAP system provides very large, inexpensive, pollution-free compressed air energy storage (CAES) facilities that can be installed quickly all over the world near existing power plants to store renewable energy. The NCAP system uses only existing equipment and infrastructure. It requires no new exotic technology. Where ever the underground strata near an existing TPP power plant will support a large reservoir for compressed air, the NCAP system can be installed using nothing more than oil well drilling techniques and technology.

In the NCAP system, the renewable wind/solar energy being generated and the CAES facility that stores it do not have to be located very close to each other or to the TPP power plant. The compressed air stored in the CAES facility can be transported (piped) long distances to its companion TPP plant just as easily as piping natural gas to the CAES. There is no heat loss because the isothermal compressed air is at ambient temperature. (Oil well drillers in the Permian Basin in Texas transport liquid $CO_2$ at 700 psi and ambient temperature over a hundred miles from New Mexico). Likewise, the renewable energy generation can be far away from either the CAES or the TPP plant. The renewable energy is normally transmitted as electrical power over the gird to drive the compressor that charges the CAES air reservoir at some other location on the grid.

Whenever the CAES companion in a NCAP facility is not generating power, the TPP plant operates as if its CAES companion did not exist.

Cooling a Nuclear Reactor

A nuclear power plant generates electricity by using a nuclear reactor to boil feed water to create high-pressure steam. This steam in turn drives turbines, which in turn drive electrical generators that create the electricity. The feed water is called the "primary coolant" in the nuclear industry since it absorbs and carries away the heat generated by the nuclear fuel rods in a reactor pressure vessel (RPV) inside the reactor. After the steam drives the turbines it is condensed back to water and is recirculated back to the RPV to be heated again to continuously generate new steam for the turbines.

Sometimes it is necessary to shut down a nuclear plant for operational reasons or because of an accident or terrorist attack, loss of outside electrical power, or a natural event such as an earthquake or fire. Thus some means must be provided to stop the nuclear chain reaction which is continuously occurring in the reactor. This is done by inserting control rods and-or chemical substances into the reactor to absorb the fission neutrons that drive the nuclear chain reaction and heat the primary coolant. However, stopping the nuclear reaction does not eliminate the danger or cool the reactor adequately. A major source of heat, called the "decay heat," remains after the fission process is stopped. This decay heat is generated by radioactive decay of isotopes within the nuclear fuel rods. Even after shutdown this heat must be continually removed from the nuclear fuel rods for days or weeks in order to stabilize the reactor. Otherwise, a nuclear "meltdown" can occur, as happened in the Three Mile Island, Pa. (1979) and Fukushima Daiichi, Japan (2011) nuclear accidents.

During normal power generation the primary coolant circulates through plumbing (termed the "primary boundary") coupled to the RPV. The primary boundary includes an outlet pipe from the RPV (commonly called the "hot leg") that carries the steam generated in the RPV the turbine(s). After condensation back to water the primary coolant exhaust from the turbine is returned to the RPV by a pipe called the "cold leg."

Existing Emergency Core Cooling Systems (ECCS) in water-cooled reactors all depend on continued circulation of the primary coolant around the fuel rods to absorb and dissipate the decay heat. The cooling fluid is circulated by large electrical or steam driven pumps that require backup power sources in case the nuclear plant is disconnected from the electrical grid that it serves. At least one newer and approved ECCS design, the AP1000 (see Non-Patent Literature below), called a "passive safety system," does not require backup emergency power. The AP1000 utilizes additional water from a large gravity flow storage tank mounted above the reactor to cool the primary coolant circulating through the reactor. The AP1000 relies on continuing decay heat to circulate the primary coolant through a heat exchanger by convection. Hence, the AP1000 design by itself cannot bring a reactor to "cold shutdown condition" (less than 100° C.), as noted below and in the discussion of the cited patent to Sato, infra.

Naval nuclear reactors, i.e., those used in submarines and ships, are of less concern because they are surrounded at all times by abundant ocean water to cool the fuel rods in a reactor in an emergency. This degree of safety has not been available for land-based nuclear plants.

The Fukushima nuclear disaster presented a horrible reality to the world. It showed that all existing emergency reactor cooling equipment in the world's nuclear power plants today can be disabled by the forces of nature or by terrorists. The existing emergency cooling systems are fragile in many ways. The biggest weakness is that the essential emergency cooling apparatus in most nuclear plants is co-localized in the nuclear plant buildings. It is rather disturbing that after the Fukushima accident there were several nuclear plant shutdowns in the U.S. where some of the backup electrical generators failed and a last-ditch battery backup system had to be used.

Water Flow Urged by Gravity for Emergency Core Cooling of a Nuclear Reactor

An example of water delivery by gravity flow is found in the above-mentioned AP1000 ECCS nuclear power plant design by Westinghouse Corp. of Cranberry Township, Pa. This design employs a large tank of emergency cooling water that is placed atop a structure within a nuclear plant. When released in an emergency, gravity causes this secondary cooling water to flow through a heat exchanger where it extracts the decay heat from the hot primary coolant in the reactor. So long as the primary coolant circulation system is intact and operating, the secondary cooling water delivered by gravity is turned into steam. The steam is condensed by cooling by outside air flow over surfaces attached to the containment building. In this design, the gravity water circulation equipment is all inside the nuclear plant structure. Its large emergency water tank is mounted high above the reactor pressure vessel and thus can be disabled by severe earthquakes. Any assault on a nuclear plant that damages the internal plumbing in which the primary or gravity cooling water are circulating can disable the AP1000 ECCS. A dedicated terrorist attack that damages a few critical pipelines and valves inside the nuclear plant can disable all emergency cooling operations. This can lead to a disastrous meltdown of the fuel rods.

Water Flow Urged by Compressed Gas

Domestic water tanks that are pressurized by compressed air above the water are well known. These tanks are designed to provide water in a given pressure range without requiring a water source to be energized for each delivery of water into or out of the tank. These tanks generally employ an impermeable membrane between the compressed air and the water below in order to avoid loss of the air by absorption of the air into the water (aeration).

Gas pressurized water tanks called "accumulators" are used in nuclear plants today. The water is commonly loaded with a borate solution or other "neutron poisons" that stop the fission reaction in a nuclear reactor during a nuclear emergency. The tanks maintain a high pressure nitrogen or water vapor bubble above the water. Because these accumulator tanks are placed inside the nuclear plant building and are under constant high pressure, their size is limited. They do not store sufficient cooling fluid to absorb the decay heat for many hours, let alone many days, from a nuclear reactor immediately after shutdown.

Very high static gas pressures (up to 200 bar) cannot be used in the water tanks above unless the tanks are relatively small. If the tank dimensions are large or the gas pressures too high, the tank cannot withstand the high hydraulic forces on its walls of the tank without bursting.

PRIOR-ART REFERENCES

The following is a list of some possibly relevant prior art that shows prior-art emergency cooling systems for nuclear power plants. Following this list I provide a discussion of these references.

U.S. Utility Patents

| Patent or Pub. Nr. | Kind Code | Issue or Pub. Date | Patentee or Applicant |
|---|---|---|---|
| 5,085,825 | B1 | 1992 Feb. 4 | Gluntz et al. |
| 7,873,136 | B2 | 2011 Jan. 18 | Meseth |
| 8,045,671 | B2 | 2011 Oct. 25 | Meseth |
| 8,559,583 | B1 | 2013 Oct. 15 | Sato |
| 8,347,628 | B2 | 2013 Jan. 18 | Gerard |
| 5,537,822 | B2 | 1996 Jul. 23 | Shnaid et al |
| 4,100,745 | A | 1978 Jul. 18 | Gyamathy |

Non-Patent Literature

1. AMERICAN NUCLEAR SOCIETY, Special Committee on Fukushima, Fukushima Accident 2011, March 2012, http://fukushima.ans.org/.
2. HANSEN, JAMES ET AL., Climate Change Experts Endorse Nuclear Power, World Nuclear News, Nov. 4, 2013, http://www.world-nuclear-news.org/EE-Nuclear-essential-for-climate-stability-0411137.html.
3. CAES Compressed Air Energy Systems, http://en.wikipedia.org/wiki/Compressed_air_energy_storage, Huntorf, Germany 290 MW CAES 1978, McIntosh, Ala. 110MW CAES 1991.
4. WESTINGHOUSE ELECTRIC CO, LLC, The AP1000 Nuclear Plant Design, http://ap1000. westinghouse-nuclear. com/index.html, Cranberry Township, Pa., USA.
5. U.S. NUCLEAR REGULATORY COMMISSION, AP1000 Safety Evaluation Report, NUREG-1793, September, 2011 (http://www.nrc.gov/reactors/new-reactors/design-cert/ap1000.html)
6. Thermal Power Station, https://en.wikipedia.org/wiki/Thermal_power_station#Superheater, Wikipedia

DISCUSSION OF REFERENCES

Gluntz and Meseth both show "accumulator" tanks containing water and a well-known neutron absorbing or "poisoning" material to halt or slow a nuclear reaction. The primary purpose of the accumulators is to inject poison neutrons into a reactor vessel. This rapidly shuts down the fission reaction within the reactor in case the control rods do not function properly, or minimizes the fission reactions after a rapid shutdown of the reactor. The accumulator tanks are limited in size and internal pressure by their inherent bursting strength. Because of this size limitation, the amount of water stored in an accumulator tank is too small to perform any major cooling of a reactor. The operation of an accumulator tank is dependent on infrastructure and piping inside the nuclear plant and, as such, it will be disabled if critical elements of the infrastructure are disabled. In addition, these tanks cannot deliver enough cooling fluid to cool a reactor at peak decay heat production for more than a few minutes or hours.

Sato describes the operational features of the above-mentioned Westinghouse AP1000 passive ECCS system. Then he describes an improvement over the AP1000. He shows a Depressurization and Cooling System (DPCS) that is attached to the AP1000 design to cool the reactor to "cold shutdown condition." The DPCS uses compressed gas to propel water out of an auxiliary water tank. Sato also shows that the water tank for his DPCS can be outside the reactor Primary Containment Vessel (PCV) and optionally buried underground. However, this DPCS apparatus is connected to and part of the internal plumbing in a nuclear plant Like the AP1000, Sato's DPCS system requires primary coolant to be circulated through the reactor and associated plumbing attached to the reactor to cool the heated coolant and hence the reactor.

Gerard describes a CAES system that utilizes a common multi-stage heat exchanger to transfer heat energy from an ambient temperature water reservoir into the compressed air. Such heat exchangers have been common for many years in thermal power plants where lower pressure steam is circulated through pipes inside the thermal plant furnace to raise the temperature of the steam before it goes into lower pressure stages of the steam turbine. Such a heat exchanger is called a "Reheater".

Shnaid claims to use waste heat for the heat of expansion (HOE) for the compressed air in his CAES system. But his waste heat comes from an additional natural gas turbine that is used to supply the HOE needed by the compressed air.

Gamarthy uses steam generated by electrical power as the HOE. As an alternative, he bleeds process steam from a thermal plant to use as HOE for the compressed air. In both cases, this steals energy from the thermal plant and it costs more money. The Gamarthy design still generates additional $CO_2$ pollution in order to supply the HOE needed by the compressed air released.

The Thermal Power Station Wikipedia entry discusses power stations in general, including the types of such stations and their components.

Many of the pressurized accumulator tanks used in current nuclear plants use heating elements to generate water vapor, which is used to provide a pressurizing fluid above the stored water. This is preferable to using stored compressed gas at high pressure inside a nuclear plant because a ruptured gas tank could present a significant safety issue. However, the electrical power required for such heating elements may not be available in a disabled nuclear power station.

While each of the above systems may be suited for their particular use, all have one or more deficiencies as noted.

SUMMARY

The emergency reactor core cooling system (ECCS) system and method described overcomes one or more of the deficiencies of prior-art systems while satisfying many requirements to prevent more nuclear accidents under the worst conditions such as happened at Fukushima in 2011. All embodiments are designed to absorb the decay heat from a large reactor after an emergency shutdown (called "SCRAM" in the industry for "Safety Control Rod Axe Man") when all internal ECCS systems have been disabled and none of the existing and prior art ECCS systems, passive or otherwise, can function. Some embodiments assume only that the reactor pressure vessel (RPV) can still receive and hold externally injected cooling fluid long enough to cool the nuclear fuel rods therein. Another embodiment cools a reactor under a very worst condition in which the RPV is so damaged (ruptured) that it can no longer hold water around the fuel rods therein.

All embodiments are "passive safety systems" in that the only energy source needed or used for the reactor cooling operation performed is the potential energy stored in the compressed gas contained in the system. Various embodiments are installed outside nuclear plant buildings. The cooling fluid used is cooling water stored separately outside a nuclear plant and-or the compressed gas itself. The various embodiments can be installed immediately using existing proven structural components and technology from the oil and gas well drilling and the railroad industries.

The system can be installed underground or safely above ground, outside the structures housing a nuclear power station so that this ECCS system is far less susceptible to damage by acts of nature or terrorism. It does not depend on or need any of the existing ECCS systems or operational cooling systems inside a nuclear plant or any emergency backup power systems. This system requires only a connection to the external cooling water input port(s) that exist on all nuclear reactors as a last resort means to cool a reactor when all internal cooling functions are inadequate.

One embodiment, called the Compressed Gas Emergency Cooling System (CGES) employs a gas, such as air or nitrogen, that is safely stored at high pressure in a first tank and is used to pressurize cooling water in another, larger tank. Unlike other gas-over-water pressure tank schemes, the cooling water tank in this embodiment is pressurized only when it is needed during a nuclear emergency. This allows cooling water to be retained long-term in much less expensive water storage tanks. The present system can bring a reactor to "cold condition" with the reactor coolant held below 100° C. long-term. All embodiments of the present system do not need nor use continued primary coolant circulation in a SCRAMMED reactor.

Another embodiment uses a compressed air energy storage (CAES) system to provide emergency reactor cooling by direct injection of large quantities of compressed gas. It is called here a Nuclear Compressed Air Power (NCAP) plant. The NCAP embodiment cools the fuel rods in a reactor under the worst case that the RPV is so damaged (ruptured) that it cannot hold liquid coolant. This is something that cannot be done by any other existing or approved ECCS system for water cooled nuclear reactors. The NCAP also combines a CAES with a nuclear power station in a unique manner that achieves great reductions in operating cost and production of climate warming $CO_2$ during normal power generating operations. These reductions in cost and pollution more than pay for the addition of a CAES plant to a nuclear plant.

The NCAP system utilizes the abundant (free) waste heat from any standard Thermal Power Plant (TPP) to replace the costly and polluting natural gas that is used to heat the expanding compressed air in an old-style CAES facility. The NCAP embodiment is a large improvement of the CGES design concept. The NCAP is very appropriate for new nuclear power stations. This heat energy transferred to the compressed air—the heat of expansion (HOE)—is necessary to supply the heat that expanding compressed air requires to prevent freezing. The operating cost reduction and elimination of $CO_2$ emissions justify connecting a CAES facility and an existing TPP plant to implement the NCAP system.

While all prior art CAES systems use some expensive additional heat source for the HOE, the NCAP system simply utilizes this free waste heat to satisfy the heat energy requirement of a companion CAES.

Potential underground air reservoir sites exist near many TPP power plants at all latitudes around the world. It has been estimated that underground CAES air reservoirs could be located under 80% of the land area of the U.S. That means there can be CAES facilities near many of the thousands of thermal power plants around the world. And, as explained herein, the CAES storage facility can be many miles distant from its companion TPP power plant in the NCAP system.

In the NCAP system, a TPP power plant and a CAES are connected by a relatively inexpensive heat exchanger so that some of the free waste heat generated by the TPP plant is transferred to the compressed air coming out of the CAES. The heat exchanger required is similar in design to the heat exchangers used at all thermal power plants and in other systems cited above. In the NCAP system, the additional heat exchanger simply transfers some of the TPP waste heat to the compressed air instead of throwing all of the TPP waste heat into the environment.

The TPP power plant in the NCAP system can be a fossil fuel, nuclear, biomass, geothermal, or solar-thermal power plant. The waste heat generated and released to the environment by a TPP plant is conveyed by a waste heat fluid (WHF) such as steam or hot water, hot exhaust gases from a gas turbine, or molten metal that stores energy. Forty to sixty percent of the thermal energy generated in a TPP plant is waste heat. Ninety percent of the power plants in the world are steam generating (TPP) power plants. More thermal energy is thrown into the environment than is converted into useful power. In fact, the amount of waste heat generated by thermal power plants is many times the total amount of renewable energy being captured on the electrical grids of the world today. The NCAP system described herein simply combines these two huge untapped or lost sources of energy to provide significantly more useful power on electrical grids.

The CGES and NCAP systems are able to cool a large nuclear reactor for many days after shutdown when all in-plant, prior art emergency cooling systems are disabled. The CGES and NCAP systems do not require any outside emergency power for their operation. They are low in cost, easily installed, and safe. As described, they can be installed immediately using existing proven structural components and technology from the oil-gas well drilling industry and the railroad industry.

Advantages

Various aspects of the present systems have one or more of the following advantages: They are passive safety systems that require no outside power and hence can be more reliable. They are or can be separate from and located away from the nuclear plant structures that contain the nuclear reactor and the in-plant emergency reactor cooling systems. They do not require external or backup power sources, other than their own stored energy. They can cool a nuclear reactor for several days after shutdown (SCRAM) when all existing in-plant cooling equipment, cooling fluid, emergency power systems are lost or disabled. They provide an add-on system that does not require major interruption of the operation of a nuclear power plant. They can be constructed with readily available and inexpensive standard components and they can be installed immediately at our aging nuclear plants. Further advantages of various aspects will be apparent from the ensuing description and accompanying drawings.

The NCAP system provides very large, inexpensive, pollution-free compressed air energy storage (CAES) facilities that can be installed quickly all over the world near existing power plants to store renewable energy. The NCAP system uses only existing equipment and infrastructure. It requires no new exotic technology. Where ever the underground strata near an existing TPP power plant will support a large reservoir for compressed air, the NCAP system can be installed using nothing more than oil well drilling techniques and technology.

In the NCAP system, the renewable wind/solar energy being generated and the CAES facility that stores it do not have to be located very close to each other or to the TPP power plant. The compressed air stored in the CAES facility can be transported (piped) long distances to its companion TPP plant just as easily as piping natural gas to the CAES. There is no heat loss because the isothermal compressed air is at ambient temperature. (Oil well drillers in the Permian Basin in Texas transport liquid $CO_2$ at 47.6 bar and ambient temperature over a hundred miles from New Mexico). Likewise, the renewable energy generation can be far away from either the CAES or the TPP plant. The renewable energy is normally transmitted as electrical power over the gird to drive the compressor that charges the CAES air reservoir at some other location on the grid.

Whenever the CAES companion in a NCAP facility is not generating power, the TPP plant operates as if its CAES companion did not exist.

There are other important benefits not provided by any other CAES design. The NCAP allows conversion of some of the TPP thermal plant waste heat into useful power, as described herein. Also, when the TPP plant is a nuclear plant, the NCAP system provides another measure of safety if the standard Emergency Core Cooling Systems fail (as happened at Fukushima). The large amount of stored compressed air in the companion CAES facility can be used to cool the fuel rods in the reactor pressure vessel.

Testimony to the uniqueness of the NCAP system is the fact that some very expensive old-style CAES are being planned today for hundreds of millions of dollars because of the demand by government agencies for utilities to build renewable energy storage.

The NCAP system is very different than the above systems. The main purpose of the NCAP is to eliminate the need for natural gas or any other expensive source of energy to retrieve the energy stored in an operational CAES facility. The NCAP does this by using the free waste heat generated by an existing thermal power plant (TPP). The NCAP system does not emit additional CO2 into the atmosphere in order to supply the HOE needed by the compressed air released from a CAES. In addition, the NCAP converts some of the waste heat from a thermal power plant into useful power by transferring it into the CAES compressed gas that then expands in an air turbine to generate electrical power.

DRAWINGS

REFERENCE NUMERALS

Figure 1:
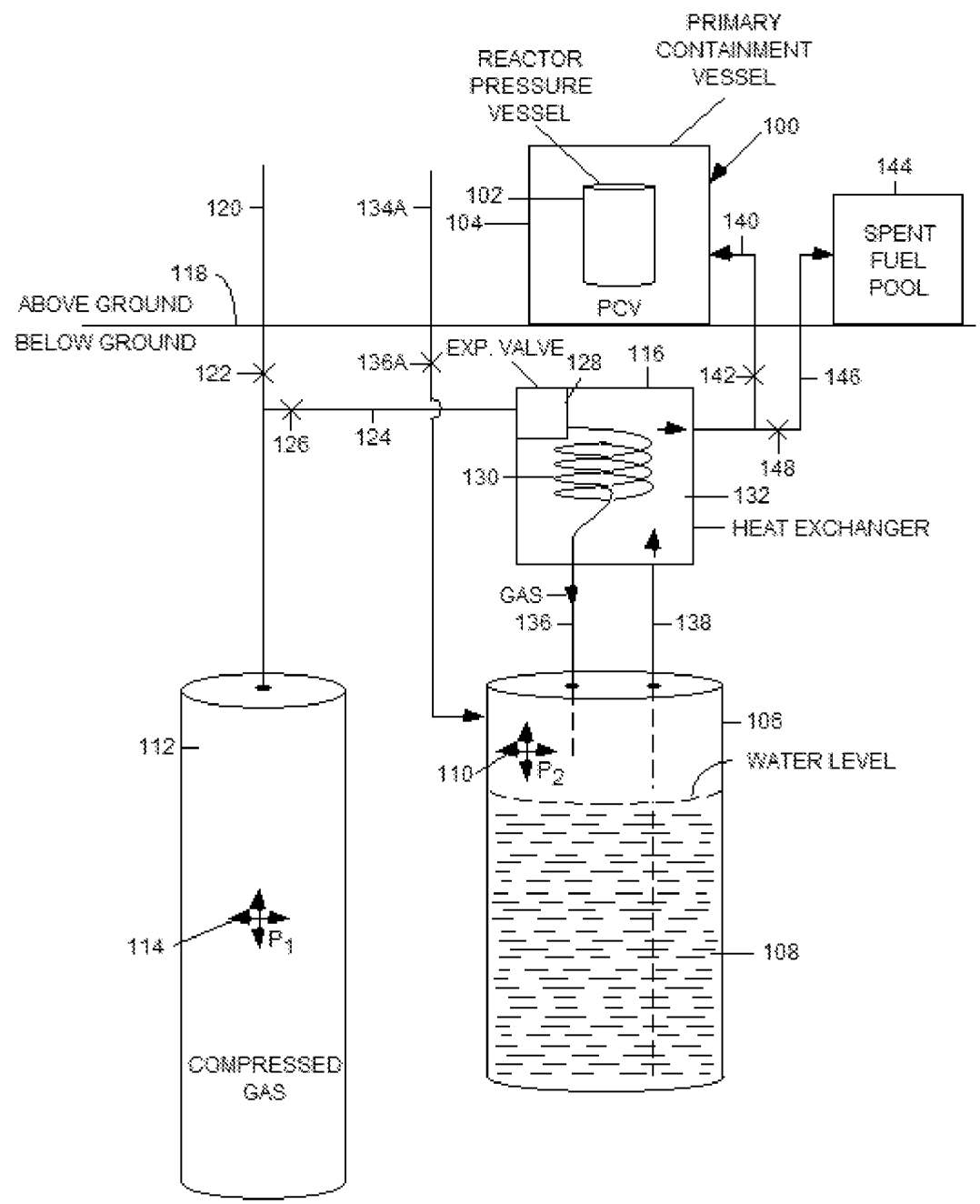
FIG. 1 shows a schematic diagram of one aspect of a CGES system.

| 100 | Nuclear Power Plant | 101 | Power plant building |
|---|---|---|---|
| 102 | Reactor pressure vessel (RPV) | 104 | Primary containment vessel (PCV) |
| 106 | Tank | 108 | Water |
| 110 | Pressure | 112 | Tank |
| 114 | Pressure | 116 | Heat exchanger |
| 118 | Ground level | 120 | Pipe |
| 122 | Valve | 124 | Pipe |
| 126 | Valve | 128 | Expansion valve |
| 130 | Coil | 132 | Volume |
| 134, 136, 138, 140 | Pipe | 142 | Valve |
| 144 | Spent-fuel pool | 146 | Pipe |
| 148 | Valve | 200 | Casing |
| 205 | Grout | 210 | Plug |
| 215 | Lid | 220 | Gasket |
| 225 | Blocks | 230 | Bolts |
| 235 | Brackets | 240 | Welds |
| 245 | Pipe | 255 | Valve |
| 260 | Handle | 265 | Pipe |
| 270 | Valve | 290 | Pipe |
| 295 | Pipe | 300 | Manifold |
| 305 | Valve | 310 | Valve |
| 315 | Pipe | 320 | Pipe |
| 325 | Valve | 330 | Valve |
| 335 | Valve | 350 | Manifold |
| 400 | CGES units | 405 | Pipes |

-continued

| | | | |
|---|---|---|---|
| 410 | Valves | 415 | Tanks |
| 420 | Tank | 425 | Valve |
| 500 | Railroad tank car | 505 | Track |
| 510 | Tanks | 515 | Manifold |
| 520 | Pipes | 600 | Railroad flat car |
| 700 | Housing | 705 | Trench |
| 710 | Fence | 715 | Roof |
| 720 | Tracks | 800 | CAES system |
| 805 | Cavern or Reservoir | 808 | Heat exchanger |
| 810 | Compressed Air Heat Exchanger | 812 | Coils |
| 814 | Pipe | 815 | Turbine |
| 820 | Generator | 822 | Conductors |
| 825 | Compressor | 830 | Pipe |
| 835 | Valve | 840 | Turbine |
| 845 | Generator | 850, 855 | Conductors |
| 870 | Valve | 875 | Pipe |
| 881 | Pipe | 900 | Fuel rods |
| 905 | Baffle | 910 | Manifold |
| 915 | Openings | 920 | Pool |
| 925 | Pipe | 930 | Valve |
| 935 | Pipe | 940 | Valve |
| 945 | Pipe | 950 | Valve |
| 1100 | Plate | 1105 | Plate |

Overview

In one embodiment, CG is safely stored at high pressure in one tank and is used to pressurize cooling water in another, larger tank. The CG is admitted to pressurize the cooling water when it is needed during a nuclear emergency. In one aspect the heat required for rapid expansion of large volumes of the CG is extracted from the water that is pressurized by the expanding gas. Equal volumes of water and expanded gas pass through a heat exchanger so that there is always sufficient heat energy for the gas to expand. The temperature drop in the water due to contact with the expanding gas is small. In another aspect, very large quantities of CG from a CAES plant are used to cool a companion nuclear reactor by expansion of the compressed gas alone inside the reactor during emergencies. This aspect provides great cost savings to the CAES during normal power generation that pays for the CAES installation near a companion nuclear power station. A CAES is a relatively inexpensive power plant (3% or less of the cost of a nuclear plant) that can be installed outside existing or new nuclear power stations.

The NCAP embodiment provides greatly enhanced safety for a nuclear plant and major cost and pollution reduction for a companion CAES plant that have heretofore not been available. The cost reduction and improved profitability for the CAES plant pay for combining the two power plants in one location as described in connection with this embodiment. The NCAP is a passive safety system in that it does not require any other external power supply or energy source other than the compressed gas stored in the CAES plant. The NCAP is a passive safety system that does not require any other external power supply or energy source.

There is an additional advantage inherent in the NCAP embodiment. If the ECCS safety systems in a nuclear plant are operational but the plant has lost its emergency backup power (as happened at Fukushima), the companion CAES system can immediately supply the backup electrical power needed by the ECCS systems in the companion nuclear plant.

The examples used herein are calculated to meet the emergency reactor cooling requirements for a 1300 MW electrical nuclear power station with a nuclear reactor that produces 3900 MW of thermal heat energy. The decay heat from the reactor fuel rods immediately after the reactor shutdown is assumed to be 7% of the rated 3900 MW thermal, equal to 273 MW immediately after shutdown, reducing to 1.5% after one hour. These values are used for explanatory purposes and are not intended to be limiting in any way. Those skilled in the art of nuclear power plant design will understand how to scale the emergency cooling system described herein to fit smaller and larger nuclear power plants.

The NCAP system eliminates the major problems with prior CAES designs. The NCAP system uses some of the vast amount of (free) waste heat generated by a thermal power plant (TPP) to supply the heat of expansion (HOE) needed by the compressed air to generate power. The TPP waste heat replaces the costly natural gas and other energy sources used by other CAES designs to supply the HOE. The connection of a standard power plant and a nearby companion compressed air storage (CAES) facility provides a "new style" CAES that allows the capture and storage of a great deal more wind, solar, and other intermittent renewable energy on grids all over the world. The NCAP system also provides improved TPP plant efficiency. The NCAP system can be installed all over the world in a few years using only existing hardware and infrastructure not decades from now when it may be too late to moderate climate warming.

More nighttime wind and daytime solar energy is available in the world than the total energy requirements of the world. Unfortunately, many wind turbines are idle at night because there is no place to store the energy that is not needed on a grid at the time. Solar power generation is also limited to what can be used during the day. The amount of waste heat thrown into the environment by existing thermal power plants in the world is almost twice as much as the electrical energy produced by all power plants. If even a small part of these immediately available untapped sources of energy, wind and solar energy and thermal plant waste heat, could be converted to useful power, the world could replace most of its CO2 emitting fossil fuel power plants and make a big reduction in climate warming. However, capturing enough additional renewable wind and solar energy to replace even one half of the existing fossil fuel power plants will require a thousand or more large renewable energy storage (RES) facilities installed on the electrical grids of the world.

The NCAP system uses waste heat from conventional thermal power plants (TPP) to provide compressed air renewable energy storage for wind and solar energy by reducing the cost and pollution generated by compressed air stored in a CAES. The NCAP system provides an inexpensive and reliable utility-scale compressed air energy storage (CAES) facility that the world can install quickly on almost all electrical grids in order to capture and store a great deal more wind, solar, and other intermittent renewable energy.

There are thousands of TPPs in the world where companion CAES facilities can be added to provide NCAP systems. As explained below, the NCAP combination provides a double benefit. Some of the waste heat from a TPP that is transferred to compressed air is converted to useful power in the compressed air turbine. As a result, this increases the net energy efficiency of the TPP plant.

When the TPP plant in a NCAP system is a nuclear power plant, the CAES in the system provides an additional safety factor. In one aspect, very large quantities of CG from a CAES plant are used to cool the fuel rods in a companion nuclear reactor by expansion of the compressed gas alone inside the reactor during emergencies. The value of this feature alone pays for the CAES installation near a companion nuclear power station. A CAES is a relatively inexpensive power plant (3% or less of the cost of a nuclear plant) that can be installed outside existing or new nuclear power stations. The NCAP is a passive safety system in that it does not require any other external power supply or energy source other than the compressed gas stored in the CAES plant. The NCAP embodiment provides greatly enhanced safety for a nuclear plant and major cost and pollution reduction for a companion CAES plant that have heretofore not been available.

There is an additional advantage inherent in the NCAP embodiment. If the ECCS safety systems in a nuclear plant are operational but the plant has lost its emergency backup power, as happened at Fukushima (1), the companion CAES system can immediately supply the backup electrical power needed by the ECCS systems in the companion nuclear plant.

The examples used are calculated to meet the emergency reactor cooling requirements for a 1300 MW electrical nuclear power station with a nuclear reactor that produces 3900 MW of thermal heat energy. The decay heat from the reactor fuel rods immediately after the reactor shutdown is assumed to be 7% of the rated 3900 MW thermal, equal to 273 MW immediately after shutdown, reducing to 1.5% after one hour. These values are used for explanatory purposes and are not intended to be limiting in any way. Those skilled in the art of nuclear power plant design will understand how to scale the emergency cooling system described herein to fit smaller and larger nuclear power plants.

CGES EMBODIMENTS

First Embodiment—FIG. 1

FIGS. 1 to 4 show aspects of one CGES embodiment. In one aspect of this embodiment, unpressurized water in a large tank is pressurized by compressed gas that is kept at high pressure in a separate tank. The water is pressurized only when it is needed during a nuclear emergency. The heat required for rapid expansion of large volumes of the compressed gas is taken from the pressurized water as it circulates around an expansion valve and coil combination and through a heat exchanger. Since equal volumes of water and expanded gas pass through the heat exchanger in a given time, the temperature drop in the water is small.

Figure 2:
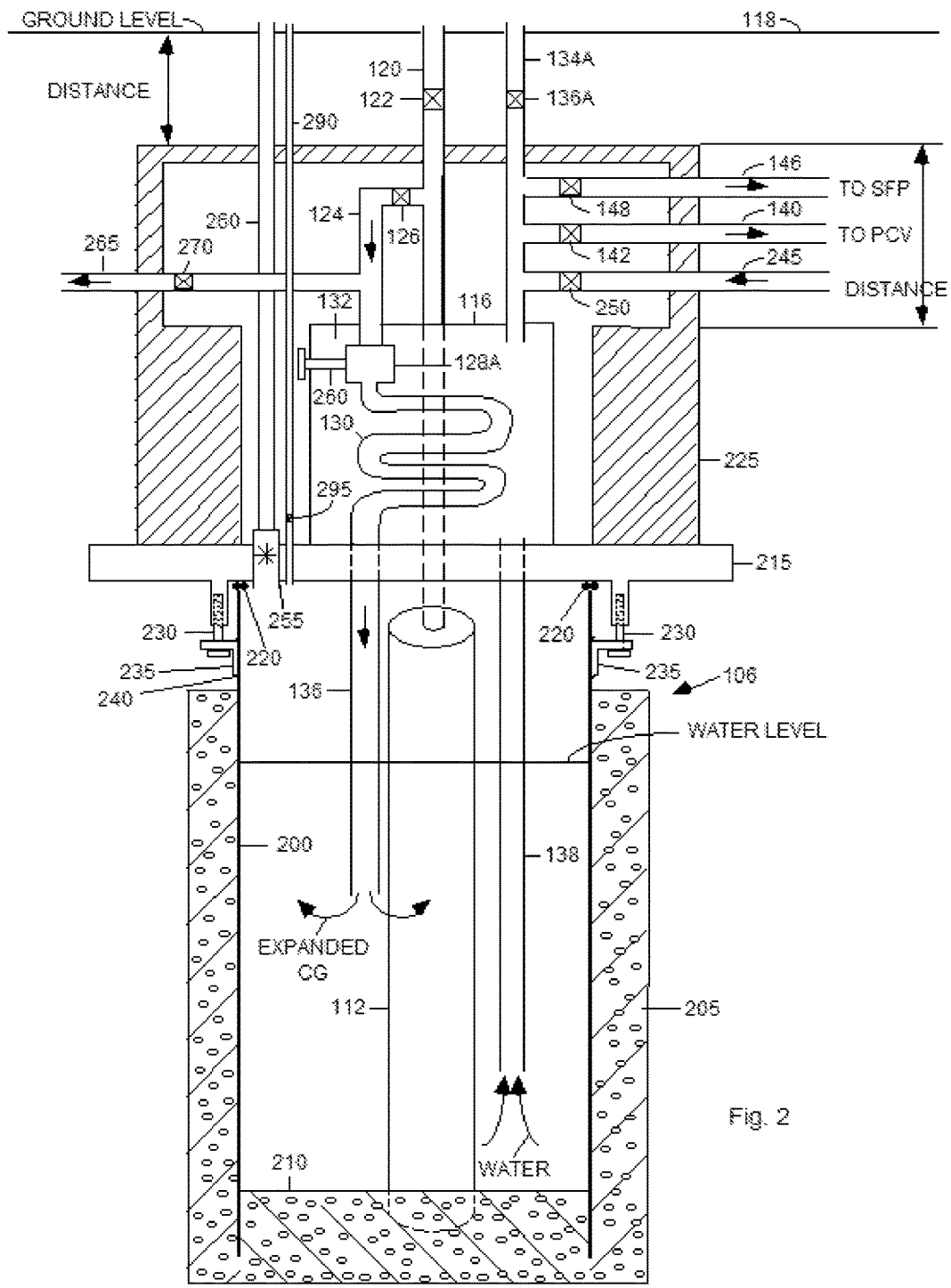
FIG. 2 is a cross-sectional view of one aspect of a CGES system.

FIG. 1 shows a schematic diagram of one aspect of a CGES system, while FIG. 2 shows one physical realization of the system of FIG. 1. The system comprises a nuclear power plant with a reactor pressure vessel (RPV) 102 that is housed within a primary containment vessel (PCV) 104. A first storage reservoir tank 106 contains water 108 at ambient pressure 110. A second storage tank 112 contains CG at high-pressure 114, a heat exchanger 116, and a plurality of valves and interconnecting pipes. Tanks 106 and 112, heat exchanger 116, and a portion of interconnecting pipes are located beneath ground level 118.

A pipe 120 extends from tank 112 to a valve 122 and then to a point above ground level 118. Another pipe 124 connects to pipe 120 at a point between valve 122 and tank 112. Pipe 124 connects pipe 120 to heat exchanger 116 via another valve 126.

Heat exchanger 116 comprises an interior volume and has a pressure regulator and expansion valve 128 and a coil 130. Valve 128 is one of many standardized pressure regulator and expansion valve designs commonly used in the compressed gas industry. Valve 128 is connected to pipe 124 at the right-hand side of valve 126. Pipe 138 delivers pressurized water from the bottom of tank 106 to volume 132 in heat exchanger 116. Additional pipes 136, 138, and 140 extend from heat exchanger 116 to tank 106 and plant 100. Pipe 136 extends from coil 130 in heat exchanger 116 to the top of tank 106. Pipe 138 extends from a point near the bottom of tank 106 to volume 132 in heat exchanger 116. Pipe 140 extends from internal volume 132 of heat exchanger 116 to plant 100 via a valve 142.

Expansion valve 128 is shown inside heat exchanger 116 to depict that it is constantly surrounded by water in heat exchanger 116. Valve 128 is of sufficient design and surface area to absorb the heat needed to keep its components at acceptable operating temperatures. Coil 130 depicts additional surface area for heat transfer that may be an integral part of valve 128.

Pipes 120 and 134 extend above ground for access to CG for tank 112 and water for tank 106. After their usefulness in a nuclear reactor is over, nuclear fuel rods still generate heat from nuclear decay and are usually stored in a cooling water bath to prevent overheating. Spent fuel rods are removed from reactor 100 and stored in a spent-fuel pool (SFP) 144. Emergency cooling water is delivered to pool 144 by a pipe 146 when valve 148 is opened.

Pipes 120, 124, 134, 136, 138, and 140 are securely and sealed to tanks 106 and 112, heat exchanger 116, and plant 100 at their points of entrance and exit.

Operation—FIG. 1

In FIG. 1, the external ECCS system pumps cooling water into plant 100 during a nuclear emergency to prevent a meltdown when in-plant Emergency Core Cooling systems are disabled or damaged. It can inject large volumes of cooling fluid immediately into RPV 102 even if there is still pressure in the RPV, so long as the pressure in tank 106 is greater than the water-steam pressure in the RPV. The pressure in tank 106 can be as high as 20.7 bar (300 psi) for a tank 106 holding over 100 m$^3$ of cooling water (see design example below). One of the most dangerous situations in a nuclear plant is sudden loss of cooling water in the RPV and its nuclear fuel rods are no longer covered by cooling fluid. The RPV pressure can drop well below 20.7 bar. The CGES system can immediately inject cooling water at a rate as high as 6500 l/m to absorb all the decay heat from a 1300 MWe (3900 MW thermal) nuclear reactor (273 MW initial rate after SCRAM). A full ECCS system to provide up to three days of reactor cooling will comprise many CGES modules as shown in FIG. 1.

Figure 3:
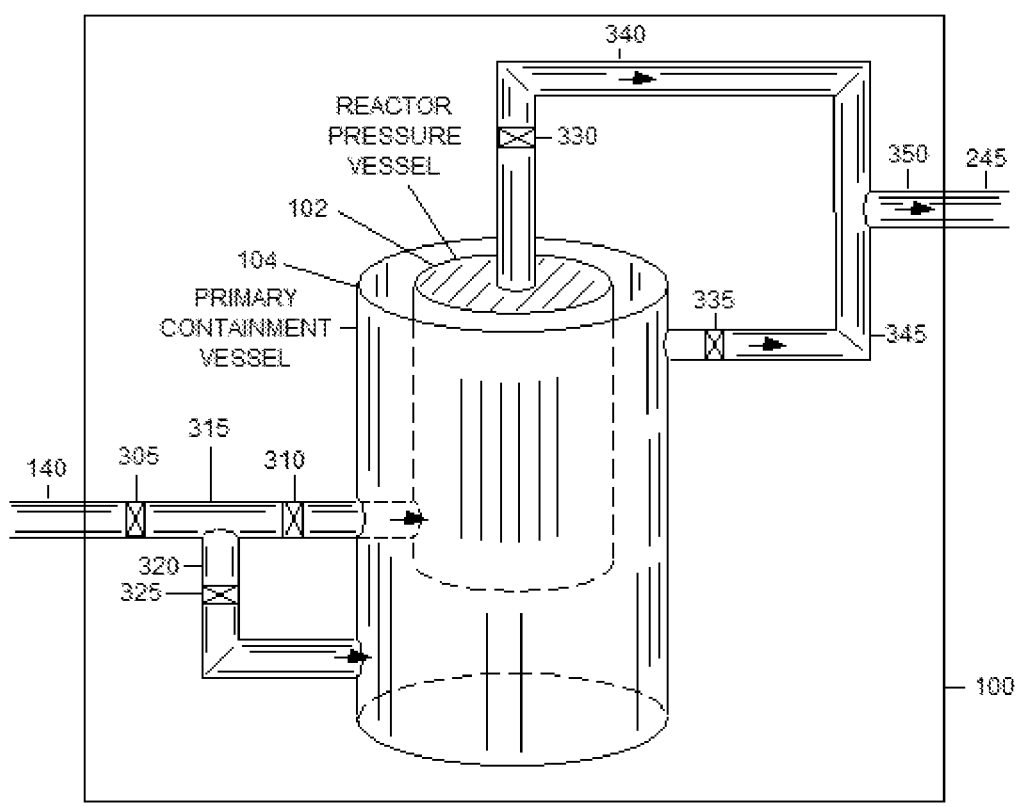
FIG. 3 is a schematic diagram of a nuclear power plant showing fluid flow after a SCRAM.

Valve 126 is first opened manually or automatically allowing high pressure gas (CG) from tank 112 to enter expansion and pressure regulator valve 128 in heat exchanger 116. Gas flows from valve 128, through coils 130, through pipe 136, and into tank 106. The pressure exerted on the surface of the water in tank 106 urges the water upward through pipe 138, into volume 132 of heat exchanger 116, and out into pipes 140 and-or 146. When valve 142 is manually or automatically opened, water flows outward through pipe 140 and onward to manifold 300 of plant 100. The water delivered under pressure to manifold 300 is sent to RPV 102 or primary containment vessel, 104, as needed, by selectively manually or automatically operating valves 305, 310, and 325 (FIG. 3).

FIG. 2—Description

FIG. 2 is a cross-sectional view that shows a physical example of one aspect of the system of FIG. 1. FIG. 2 shows additional components that strengthen the design in FIG. 1 in order to contain the high pressures during both storage and operation.

The present aspect shown is an underground version of the CGES system. In this embodiment, CG tank 112 is mounted inside cooling water tank 106. This is an embodiment that allows both tanks to be contained in one bore hole that is constructed by standard oil-gas well drilling techniques.

When valve 126 is open, CG from tank 112 flows into pressure reduction valve 128. Control device 260 adjusts the pressure of CG leaving valve 128 to keep the pressure in tank 106 below the maximum allowable level.

Valve 128 is manually or automatically adjusted to set the pressure of CG from tank 112 entering coils 130 of heat exchanger 116. Safety relief valve 255 assures that the maximum allowable pressure in tank 106 is not exceeded. Adjustable flow rate valve 142 controls the rate of pressurized water leaving tank 106 which determines the rate of expanded CG allowed into tank 106 when valve 126 is open. Water flowing from tank 106 through volume 132 of heat exchanger 116 provides heat needed to prevent freezing of components in 116 or water in tank 106 by the expanding gas from tank 112.

A tank 106 is formed within a borehole of predetermined depth and diameter in the earth. The tank has a cylindrical steel casing 200 that is open at both ends and has a diameter less than that of the borehole. During installation, casing 200 is lowered into the borehole and securely held a short distance above the bottom. Standard grouting procedures from in the oil-gas well drilling industry are used to insert concrete grouting material 205 between casing 200 and the bottom interior of the borehole to form a concrete plug 210 at the bottom of the borehole and grouting 205 around casing 200.

Grouting 205 and plug 210 are of sufficient size and composition to prevent significant leaking of fluids contained therein or damage to casing 200 at the operating fluid pressures utilized. A lid 215 closes tank 106 at the upper end of casing 200. A gasket 220 or other sealant means is placed between the top of casing 200 and the bottom surface of lid 215 to prevent gas leakage when the present system is activated.

A number of concrete blocks 225 are placed atop lid 215 to further weigh it down against the top of casing 200 and gasket 220, thereby forming a tight seal for tank 106. A plurality of bolts 230 further secure lid 215 to casing 200. In this aspect, bolts 230 bear against brackets 235 that are secured to casing 200 by a plurality of welds 240. When bolts 230 are tightened, lid 215 is clamped securely in place on tank 106.

At the upper right of FIG. 2, an additional inlet pipe 245 is connected to pipe 134A via a valve 250. Inlet pipe 245 is connected to an outside source such as RPV 102, primary containment vessel (PCV) 104, spent-fuel pool (SFP) 144 or another source for return or delivery of water to tank 106. Water is also delivered to tank 106 through pipe 134A via valve 136A, heat exchanger 116, and pipe 138.

A vent line 290 and a valve 295 are used to vent air from tank 106 when fluid is added via pipes 134 and 138 or pipe 245. Valve 295 is opened to vent displaced air from tank 106; otherwise it is closed.

The fluid returned from plant 100 to tank 106 can be the hot fluid generated in the RPV from the cooling water initially injected by this tank 106 or other tanks 106 into plant 100. In this manner, the reactor cooling capacity of water initially stored in tanks 106 can be extended.

A few days after SCRAM, the decay heat rate falls below 0.4% of rated reactor thermal power. When the heat transfer rate through the casing 200 of one of more tanks 106 equals or exceeds the decay heat rate in a reactor, a CGES system comprising several tanks 106 can cool the reactor indefinitely by recycling the cooling water in tanks 106.

Underground tank 106 that is in a deep bore hole as shown in FIG. 2 can maintain a substantial heat transfer rate through its steel casing 200 and concrete grout 205, especially if the bore hole passes through underground aquifers where water is in constant contact with the outside grouting 205.

The above cooling water recycling capability of the present CGES system is important in comparison to the AP1000 system, supra. The AP1000 cannot return a reactor to cold condition where the coolant is less than 100° C. The AP1000 must have continuous hot fluid in the reactor vessel to maintain circulation of the primary coolant through a heat exchanger that uses the gravity water from the AP1000 system tank to absorb decay heat from the hot primary coolant. In contrast to the AP1000, the CGES, by recycling its cooling water as described, can cool a reactor below 100° C. and maintain that condition long-term.

Moreover the CGES does not require Sato's DPCS apparatus, supra, to bring the reactor to cold shutdown condition. Both the AP1000 and Sato's apparatus use reactor primary coolant circulation to cool the reactor. They are critically dependent on plumbing internal to the nuclear plant, but such plumbing can be disabled by attacks by nature or terrorists. In contrast, the present CGES cooling operation does not use the primary boundary plumbing connected to the reactor pressure vessel (RPV). The CGES system is effective even if the internal plumbing is damaged and cannot retain coolant in the primary boundary. The CGES system injects new coolant into a reactor through the external coolant input port and constantly replaces the coolant in the reactor anytime it is not covering the fuel rods in the reactor. The CGES coolant is constantly evaporated to absorb maximum decay heat and then vented out of the reactor pressure vessel (RPV) as water vapor, which is then replaced by more CGES coolant. The CGES system works best when any hot primary coolant is vented out of the RPV after a SCRAM so that the injected CGES coolant is not wasted absorbing the heat from the left-over primary coolant.

The safety pressure release valve 255 below lid 215 allows venting of excess pressure within tank 106 whenever the pressure exceeds a pre-set maximum allowed pressure (usually less than 21 bar for a tank 106 greater than 1 meter in diameter). A pipe 260 extends from valve 255 to the air above ground level for venting. In various aspects an embodiment can have two or more safety relief valves 255 mounted on tank 106 for redundancy in this critical component that protects tank 106 from excessive pressures.

In the present aspect, gas expansion valve 128A includes a handle 260 for adjustment of the output pressure of valve 128A.

Valves 126, 142, 148, and 270 all are one-way (check) valves that allow flow only in the direction of the arrows shown in the respective lines. These check valves prevent backflow into the lines in case of excessive pressures on the other side of the valve, i.e., as in line 140 where excessive pressure in the RPV or PCV could force water back into tank 106 and damage it. Pipe 265 allows the CG in tank 112 to be directed elsewhere when valves 126 and 270 are open. For example, when the CG in tank 112 is nitrogen, the nitrogen can be used to recharge nitrogen supplies that are used to operate valves in a nuclear plant or to flood a reactor vessel with inert nitrogen to reduce known hazards of oxidation of metals in the fuel rods and to prevent an explosion of hydrogen gas.

Exemplary Design Specifications and Dimensions for Tanks 106 and 112.

The following are specifications for tanks 106 and 112 in an exemplary CGES system.

1. Tank 106 has a volume of 100 m³ (cubic meters).
2. Tank 112 has an initial CG pressure of 200 bar (3000 psi) and a maximum pressure of 20.7 bar (300 psi) in tank 106 during a nuclear emergency to limit internal hydraulic forces in tank 106 (as controlled by valve 128A in FIG. 2).
3. The volume ratio of tank 106 to tank 112 is 10:1 (100 m³ of water to 10 m³ of CG).
4. Cooling water must be delivered from tank 106 at a rate of 6552 l/m (1731 gpm) to handle the maximum decay heat rate of 273 kJ per sec (7%) from a 3900 MW thermal reactor immediately after SCRAM (assuming 2,500 MJ per m³ heat absorbed by injected cooling water raised from 20° C. to full evaporation in the reactor).
5. Tank 106 has an inside diameter of 1.19 m (47 in) and is 100 meters deep with a gross volume of 112 m³. The wall thickness of tank 106 is 0.95 cm (0.375 in). The critical stress in the wall of tank 106 with internal gas pressure 20.7 bar (300 psi) is 1,296 bar (18,800 psi). (This assumes no support from the concrete grouting outside the well casing in the case that tank 106 is in a borehole.)
6. Tank 112 has an inside diameter of 0.357 m (14.06 in) and is 100 meters deep to yield a volume of 10 m³. The wall thickness of steel pipe for tank 112 must be at least 2.68 cm (1.054 in) to keep the critical stress in the wall of this tank no greater than 1,379 bar (20,000 psi) for internal gas pressure of 20.7 bar (3000 psi).
7. The maximum expansion of the CG from tank 112 will be 11:1 when tank 106 is empty. The final pressure in tank 106 will be 200 bar divided by 11=18.2 bar (264 psi). This is enough remaining pressure to lift the last water in tank 106 up to a height of 186 m (609 ft).
8. At a pressure of 20.7 bar (300 psi) in tank 106 with a diameter of 1.19 m (47 in), the upward force on lid 215 (FIG. 2) is 2,315,300 N (520,500 lb). The 1.19 m diameter casing 200 of tank 106 with 0.95 cm thick steel wall can resist an upward force of 4,525,542 N (1,017,400 lb) with a maximum 1,379 bar (20,000 psi) stress in the casing wall when lid 215 is securely attached to casing 200. This is 2.1 times the actual load force in the casing wall due to the upward force of 2,315,300 N, for a safety factor of 2.1. The pressure in tank 106 could increase to 2.1 times 20.7 bar=43.5 bar and not exceed the stress limit of 1,379 bar in the wall of tank 106.
9. Concrete weight 225 on tank 106 should be 444,800 N (100,000 lb) as an added safety factor to resist the upward hydraulic force on the top of tank 106 and reduce the load on the outer part of lid 214. Fifty tons of concrete requires 19.12 m³ (25 cu yd) of concrete at 11,518 kg per m³ (4,000 lb/cu yd).

A heat transfer rate of 10.25 KW into the CG is required for it to expand by 10:1 at a rate of 0.1092 m³/s (1800 gpm) to propel water out of tank 106 at the same volume rate. 25 kW is 25 kJ/s taken from the water leaving tank 106 at the rate of 0.1092 m³/s. The specific heat of water is 4.18 MJ/m³/deg C. The CG takes only 25 kJ from each 0.1092 m³ of water that flows through heat exchanger 116. This is a rate of 228 kJ/m³ of water. The temperature drop per m³ of water is 228 kJ/m³ divided by 4.18 MJ/m³/° C.=0.05° C. Thus the water temperature drops by far less than 1° C. as it flows out of tank 106.

A person skilled in the art of physics or engineering can scale the above design example to other workable dimensions for tanks 106 and 112 and CG pressures as appropriate.

All metal components shown in FIG. 2 are steel or another alloy that is sufficiently strong to meet the design requirements of the CGES and are not susceptible to corrosion in the environment shown.

Connection of CGES to Plant 100—FIGS. 2 and 3.

FIG. 3 shows a schematic diagram of a nuclear power plant that illustrates paths that cooling fluids take after SCRAM. When a CGES is activated, water leaves tank 106 (FIG. 2) and is delivered to plant 100 via pipe 140 or inlet manifold of plant 100. A shut-off valve 305 on manifold 140 is opened to admit water into plant 100. A pipe 315 conducts water to a valve 310. A pipe 320 branches from pipe 315 and conducts water to a valve 325. When valve 310 is open, water is directed into RPV 102. When valve 325 is open water is directed into primary containment vessel 104. Either or both of valves 310 and 325 can be opened, depending on cooling requirements after a SCRAM in plant 100.

Additional valves 330 and 335 are opened as appropriate to conduct water and steam from RPV 102 and primary containment vessel 104 to a manifold 350 within plant 100. Manifold 350 is connected to pipe 245 (FIG. 2) so that water and steam from plant 100 can be returned to tank 106 if desired.

First Embodiment Operation—FIGS. 1 to 3

In the following example a CGES module as shown in FIG. 2 has been installed and connected to a plant 100 (FIG. 3). All aboveground connections to the CGES are sealed to prevent unwanted matter from entering the system. All valves in the CGES system are initially closed.

Preparing CGES for Use.

A source of water (not shown) is connected to pipe 134A and valve 136A is opened. A predetermined amount of water flows through pipe 134A and volume 132 of heat exchanger 116 and into tank 106. When the amount of water supplied fills approximately 95% of tank 106, valve 136A is closed, stopping the delivery of water to tank 106.

A source of high-pressure gas (air, nitrogen, or other gas) is connected to pipe 120 and valve 122 is opened. Gas is urged from the source into tank 112. When a predetermined pressure is reached, valve 122 is closed, stopping the delivery of gas into tank 112.

When the delivery of gas and water to the CGES system is complete, the sources of gas and water are optionally removed or left in place.

Activating CGES after SCRAM.

As with the system of FIG. 1, assume that a disaster occurs so that the reactor must be shut down under emergency conditions (SCRAM). To prevent a meltdown, the present system pumps cooling water into plant 100. Valve 126 is first opened manually or automatically allowing gas from tank 112 to enter expansion and pressure regulator valve 128A in heat exchanger 116. Gas flows from valve 128A, through coils 130, through pipe 136, and into tank 106. The pressure exerted on the surface of the water in tank 106 urges the water upward through pipe 138, into volume 132 of heat exchanger 116, and out into pipe 134A. When valve 142 is opened manually or automatically, cooling water flows outward through pipe 140 and onward to manifold 300 of plant 100. The water delivered under pressure to manifold 300 is sent to RPV 102 or primary containment vessel, 104, as needed, by selectively operating valves 305, 310, and 325 (FIG. 3) manually or automatically.

Valve 128A control device 260 is manually or automatically adjusted to control the pressure of CG leaving valve 128A so that it does not exceed the maximum pressure allowed in tank 106.

Other CGES Activities—Delivering Water to a SFP

A pipe 146 (FIG. 3) is connected to a SFP (not shown) for delivery of cooling water to any spent fuel rods that still give off heat and must be cooled when normal plant 100 cooling water circulation is disabled. Starting with all valves closed and sufficient gas in tank 112 and water in tank 106, valves 126 and 260 are opened and valve 260 is adjusted so that pressure inside tank 106 is sufficient to urge water to flow out pipe 146. Valve 148 is then opened and water flows to SFP from tank 106 until either tank 106 empties or sufficient water is delivered. Valve 148 is then closed and gas and water supplies to the CGES are restored, if necessary.

Recovery and Recycling of Water and Steam from Plant 100

In FIG. 2, a pipe 245 is connected to outflow manifold 350 of plant 100. Initially, all valves are closed. When it is desired to return water from plant 100 to a tank 106, valve 250 is opened and water and-or steam flows from plant 100 back into tank 106. This feature allows the venting of the initial high pressure water and steam in the SCRAMMED nuclear reactor back into empty tanks 106 instead of venting the radioactive steam into the environment. This is extremely important when it is necessary to inject cooling water into the reactor that has reached its maximum heat content and internal pressures because it cannot circulate and cool its existing cooling fluid. By this means, the pressure and water-steam in the reactor can be reduced to allow injection of new cooling water from tanks 106.

Return pipe 245 also allows the CGES embodiment in FIGS. 2-5 to perform long-term cooling of a the reactor beyond the critical first days after SCRAM. Cooling water from a tank 106 that is heated in and then evaporated out from the reactor can be returned to other empty tanks 106 for later reuse as cooling water. In this manner, the cooling capability of an initial amount of water in a set of tanks 106 can be extended indefinitely after the decay heat rate in the reactor drops low enough so that cooling water from tanks 106 can be recycled and condensed in empty tanks 106 faster than it is needed to cool the reactor. In particular, deep underground tanks 106 as shown in FIG. 2 can provide substantial cooling for water and-or steam recycled from the reactor as described above. This CGES embodiment eventually can cool a reactor below the desired "cold shutdown" condition whereby the temperature within the reactor is less than 100° C.

The CGES system is a substantial improvement over the AP1000 system. The AP1000 system requires continuous primary cooling water circulation through a reactor. The CGES embodiment can cool a reactor even after its primary cooling water has been lost.

Delivery of Gas to Another Location

A pipe 265 in FIG. 2 branches from pipe 124 and is arranged to deliver compressed gas to other locations. For instance, if the compressed gas is nitrogen, the nitrogen can be delivered to storage tanks within a nuclear plant 100 for nitrogen actuated control valves. When it is desired to deliver gas through pipe 265, valves 126 and 270 are opened and gas from tank 112 exits the CGES via pipe 265. Closing either valve 126 or 270 stops the delivery of gas.

Figure 4:
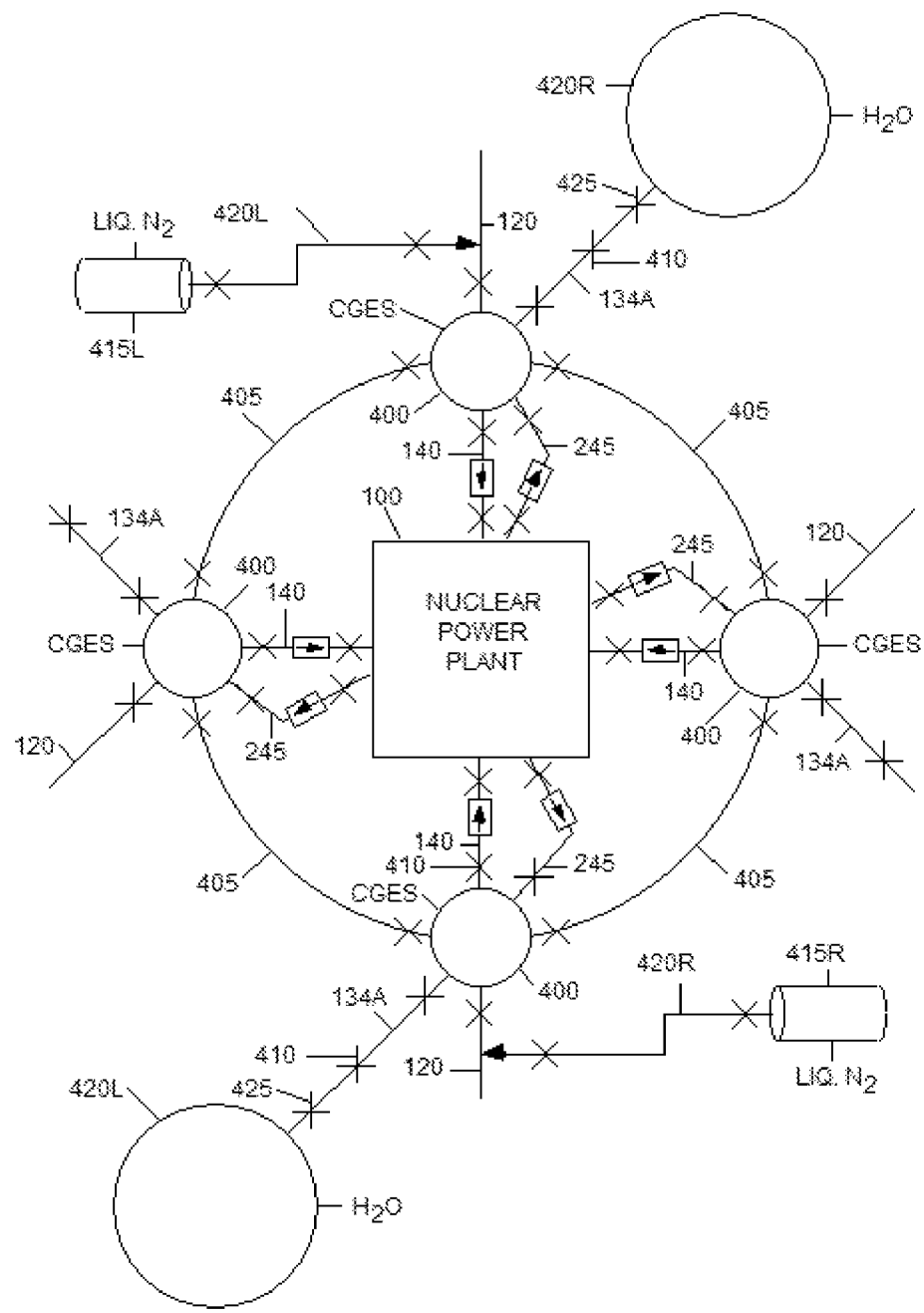
FIG. 4 is a schematic plan view showing a plurality of CGES units connected to a nuclear plant.

First Alternative Embodiment—Description and Operation—FIG. 4

FIG. 4 is a schematic plan view of one aspect in which a plurality of CGES units 400 are connected to a nuclear plant 100. This arrangement provides redundancy in case one or more CAES units are damaged or inaccessible.

A plurality of pipes 405 connect the water storage volume in each of tanks 106 (FIG. 1) to that of its neighbors. Another plurality of pipes 140 are arranged to deliver water to plant 100 when required after a SCRAM, as explained above. An additional plurality of pipes 245 are arranged to pass water and steam back from plant 100 to CGES units 400. Manual on-off valves 410 are installed at the beginning and end of each pipeline segment so that a damaged or leaking pipeline segment can be isolated by closing the appropriate valves 410. Some or all of valves 410 are automatic if required. Additional pipes 120 and 134A permit CG and water from external sources to be injected into tanks 112 and 106, respectively.

Additional tanks 415L and 415R contain liquid nitrogen that is delivered to pipes 120 via pipes 420L and 420R, respectively. The liquid nitrogen in these tanks is used to recharge tanks 112 106 (FIG. 1) as necessary. Additional tanks 420L and 420R are above-ground, standard water storage tanks of the type commonly employed by water utility districts for bulk storage of water. Their capacity is typically 3,700 m$^3$ (1,000,000 gal) or more. Tanks 420L and 420R replenish the water in tanks 106 in CGES units 400 (FIGS. 1 and 2) for long-term reactor cooling operations after the critical first days after reactor shutdown.

Valve 425L controls water flow from tank 420L to a tank 106 in a CGES unit 400 by line 134A. Valve 425R controls water flow from tank 420R to the input line 134A to a tank 106 in a CGES unit 400. Many tanks 420L or 420R can be stationed around a nuclear plant and connected as shown to any or all of tanks 106 in CGES units 400. Water is stored in tanks 420 at ambient atmospheric pressure, and flows from tanks 420 to tanks 106 by gravity. When no pressure is in the reactor and it is underground below the level of tanks 420, water from these tanks can be sent directly to the reactor by appropriate settings of pipeline valves shown in FIG. 4.

All pipes are placed on or under open buffer areas or beneath parking areas around plant 100 so that there is no loss of surface space around plant 100.

Figure 5:
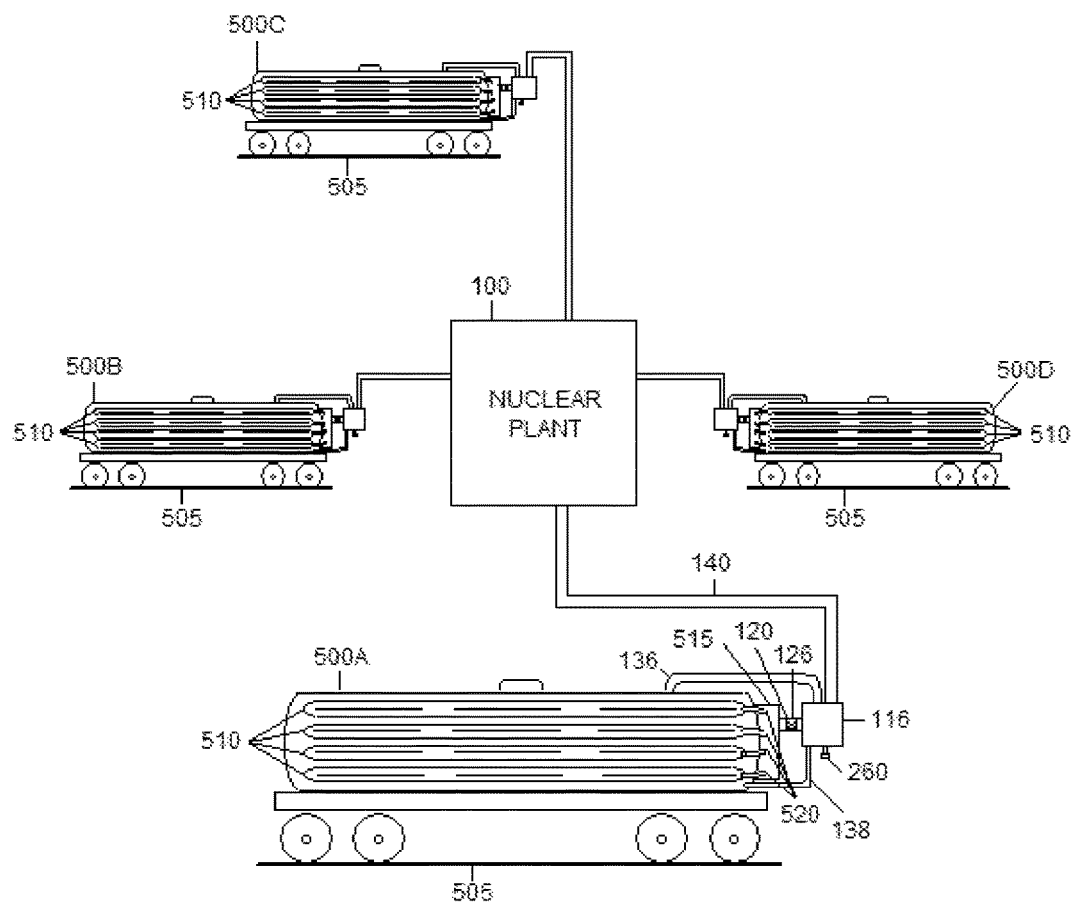
FIGS. 5 to 7 show aspects of an embodiment of a CGES using standard railroad tank cars for water storage.
Figure 6:
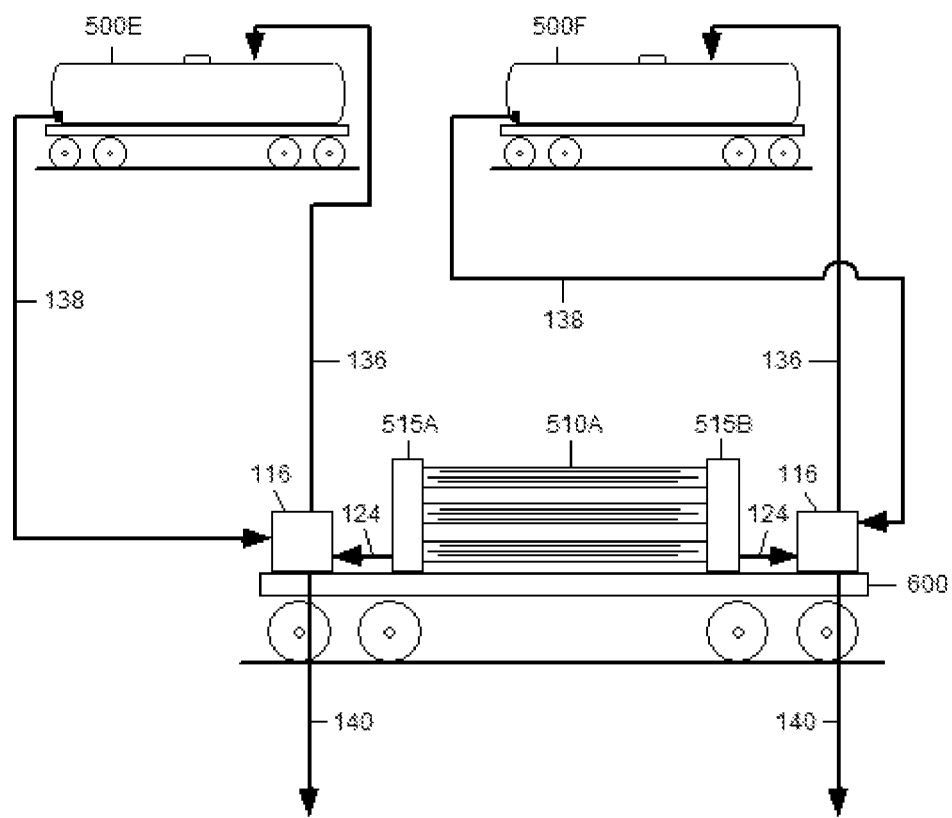
Figure 7:
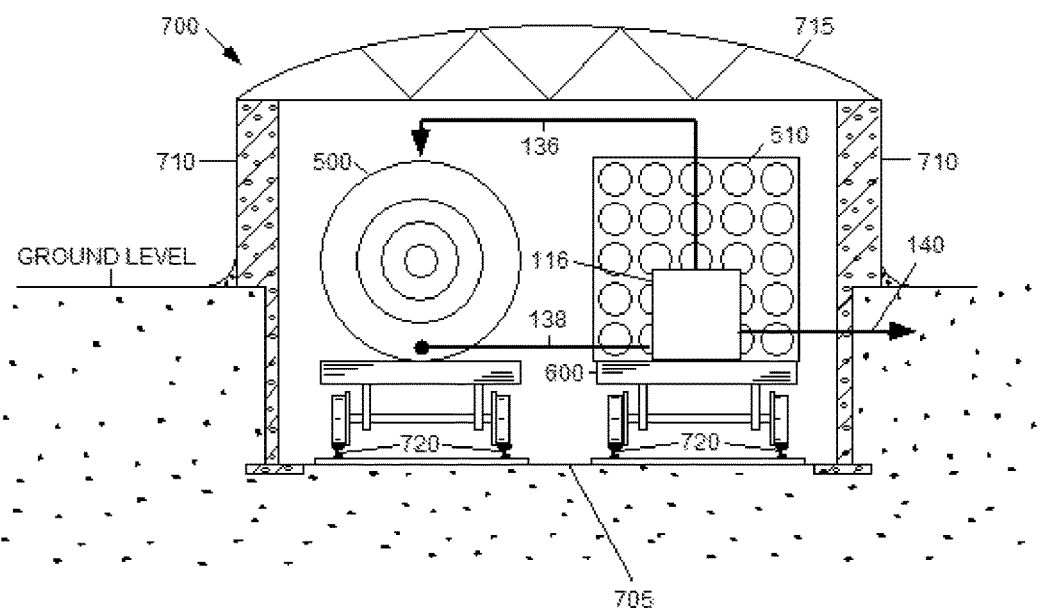

Second Alternative Embodiment—Description and Operation—FIGS. 5 to 7 Above Ground Versions of the CGES System—First Version FIGS. 5 to 7 show aspects of an embodiment of the CGES system that uses standard railroad (RR) tank cars for transport an above-ground version of water storage tank 106 (FIG. 2). With CG tanks 112 attached to each tank car or supplied separately, this provides a simple, inexpensive, and very reliable CGES system that can be installed immediately at most any nuclear power station. This CGES system embodiment is called a RRTC (Railroad Tank Car) system. The RR tank car CGES modules comprise portable units that can be transported from one location to most any other nuclear plant in trouble within 24 hours.

FIG. 5 is a schematic view showing a plurality of railroad tank cars 500A through 500D in the vicinity of a nuclear plant 100. Cars 500 are moved on a plurality of track segments 505 that are located at predetermined positions and distances in the vicinity of plant 100. Although four tank cars are shown, fewer or more can be used.

Railroad tank cars can hold up to 128.7 m$^3$ (34,000 gal) of liquid, with some older tank cars holding up to 189.27 m$^3$ (50,000 gal). Although rail cars 500 serve the function of tank 106 (FIG. 2), they have greater capacity than the 100 m³ capacity of tank 106 used in the design calculation example above. A plurality of tanks 510 are mounted on each rail car. Tanks 510 serve the function of tank 112 (FIG. 2). In one aspect, each of tanks 510 is a 15.2 m long, 0.36 m in diameter high-pressure steel pipe, and there are between 6 and 8 tanks 510 on each rail car. The combined volume of the 6 to 8 tanks 510 is about equal to that of tank 112 used in the design example above to provide at least 10 m³ of CG at 200 bars (2900 psi) of pressure.

Railroad tank cars can withstand internal gas pressures up to 6.9 bars (100 psi). That is more than enough pressure to force water at high flow rates into plant 100 during a nuclear emergency.

In FIGS. 5 to 7, the same pipelines and valves that interconnect CG tank 112 to water tank 106 in FIG. 2 (with the same reference numbers) are used to connect tanks 500 and 510. Although present as indicated in FIG. 2, valves, other than valve 126, are not shown in FIGS. 5 to 7.

In FIG. 5, tank car 500A is expanded to better show the components used in this aspect of the present embodiment. The rail car tank on cars 500 is equivalent to tank 106 in the first embodiment. Tanks 510 are connected to a sealed manifold 515 by a plurality of pipes 520. Tanks 510, pipes 520, and manifold 515 are collectively equivalent to tank 112 in the first embodiment. When valve 126 is opened, CG flows from manifold 515, through pipe 120 and valve 126 into expansion and pressure regulator valve 128A (FIG. 2), indicated by pressure adjusting handle 260, through heat exchanger 116, and out via pipe 136 to pressurized tank 500A. Pressurized water flows out line 138 from tank 500A into heat exchanger 116 and then out pipe 140 to plant 100. Thus pressure is applied to the interior of tank 500A via pipe 136 and water is urged to leave tank 500A via pipe 138, passing through volume 132 of heat exchanger 116, and finally on to plant 100 via pipe 140.

The RRTC system sacrifices some protection against assault by acts of nature or terrorism that is inherent in the underground CGES system of the first embodiment. However the immediate availability of many railroad tank cars and flat cars around the industrialized world makes the RRTC system a very practical and inexpensive CGES that can be protecting a nuclear power plant within a few months from the start of installation, at very little cost. The RRTC has all the operational characteristics of the other CGES embodiments described above.

Second Version—FIG. 6

FIG. 6 is a schematic diagram showing an alternative form of the tank car system of FIG. 5. In this aspect a plurality of tanks 510A serves a plurality of rail cars 500E and 500F. Although two cars are shown, more can be added. Tanks 510A are a stack of pipe sections that terminate in sealed manifolds 515A and 515B at each end of the stack. Tanks 510A are mounted on a flat rail car 600. CG is released from tanks via pipe sections 124 when valves 126 and 128 (not shown in this drawing) are opened. When the CG is released, CG pressure is applied to tanks 500 via pipes 136, water is forced out of tanks 500 through pipes 138, through heat exchangers 116, and out through pipes 140 to nuclear plant 100 (not shown in this figure).

To provide enough CG to pressurize at least six water storage tanks 500, 40 to 60 pipe sections 510A with dimensions described above should be provided. In the present arrangement, many railroad tanks 500 can be brought near flatcar 600 with tanks 510A and connected to lines 136, 138, and 140. When a water tank car is empty, it can be quickly disconnected from the CG source on flatcar 600 and replaced by another, thereby providing a continuing source of water to plant 100.

Third Version—FIG. 7

FIG. 7 shows a third version, specifically a cross-sectional end view of a housing 700 that protects and conceals an RRTC. A safe parking and connection area for the RRTC and flat cars placed around a nuclear plant can be as simple as a shallow trench that has concrete walls on either side to protect the railroad cars from the high winds of a tornado and terrorist attacks with vehicles. Empty cars can be rolled away during a nuclear emergency and either refilled or replaced by previously filled cars.

Tank cars 500 and flat cars 600 with CG storage tanks 510 are parked in a trench 705 dug into the ground to partially protect the RRTC system. A strong concrete fence 710 runs along both sides of trench 705. A roof structure 715 sits on fence 710 and spans across trench 705 above the rail cars. A plurality of railroad tracks 720 are laid on the ground at the bottom of trench 705.

This embodiment of the RRTC system provides substantial protection from tornadoes and vehicular attacks by terrorists. The below ground level placement of tracks 720 also allows easy movement of replacement tank cars 500 and CG storage cars 600.

This RRTC system is not expensive to construct. It requires mainly dirt excavation and placement of prefabricated fence sections 710 along the edges of trench 705. Fence sections 710 can be standard K-rail concrete sections used as traffic barriers on roadways, for example.

Full CGES System for Large Nuclear Plant

A full CGES Emergency Core Cooling System using the CGES embodiments shown in FIGS. 2-4 and FIGS. 5-7 will normally comprise many interconnected water tanks 106 and CG tanks 112 as shown in FIG. 4. For instance, the total decay heat from a 1300 MWe (3900 MWt) reactor for the first three days after SCRAM requires at least 22 tanks 106 each holding 100 m³ of cooling water plus as many companion tanks 112 holding 10 m³ of CG at 200 bar (or equivalent CG volume stored by other means). A smaller nuclear plant, say, 1000 MWe, would require only 17 tanks 106 of 100 m³ capacity each.

The tanks 112 sources of CG shown in FIGS. 1 and 2 can be realized in many forms other than those shown in the embodiments described herein. Tanks 112 can be separate bore holes lined with steel nearby the tanks 106 that they pressurize. Above ground tanks 112 can be segments of high pressure pipe, such as used for high pressure natural gas pipelines. One of the least expensive ways to store and deliver large quantities of CG is to use many segments of small diameter, thick-walled pipe stacked together and connected as shown for item 510A on flatcar 600 in FIG. 6. CG tanks can be realized with large capacity plastic bags or bladders that are filled with CG and held deep underwater to balance the internal pressure of the CG. An advantage of this approach is that the CG is delivered at constant pressure equal to the water pressure on the bags.

Inherent Safety of Compressed Gas Supply Systems.

The CG energy sources for all embodiments of the CGES system can be replenished by external or emergency air compressors and compressed air sources such as the liquid nitrogen tanks 415L and 415R shown in FIG. 4. Attaching additional sources of compressed gas to an existing CG delivery system is both far easier and safer than attaching backup electrical generators to an existing power grid. Backup generators attached to a nuclear plant must be matched carefully in voltage and phase with the internal electrical system. However, using check-valve connectors, additional sources of compressed air, such as tanks 112 in the above embodiments, can be attached easily to an existing CG supply system with reduced concerns for safety or compatibility. CG will flow from the new system to the existing supply system only when the new system pressure is greater than the pressure in the existing system. The importance of this feature of the CGES system was demonstrated by the frustration of operators during the Fukushima accident in 2011 when they tried to connect outside backup electrical generators to the nuclear plant electrical switching equipment that had been disabled by the tsunami.

NCAP—New Compressed Air Energy Storage (CAES) System—Description and Operation—FIGS. 8-12

The system described below is called NCAP for "New Compressed Air Power." The NCAP system is a Compressed Air Energy Storage (CAES) system combined with a conventional thermal power plant that functions in several configurations. In one configuration, it is an efficient energy storage system that can be used to store energy, in particular, renewable energy, at any time so that the stored energy can be returned to an electrical grid at a later time. In another NCAP configuration, the CAES is an Emergency Core Cooling System (ECCS) for a nuclear power plant when its companion thermal power plant is a nuclear power plant.

Figure 8:
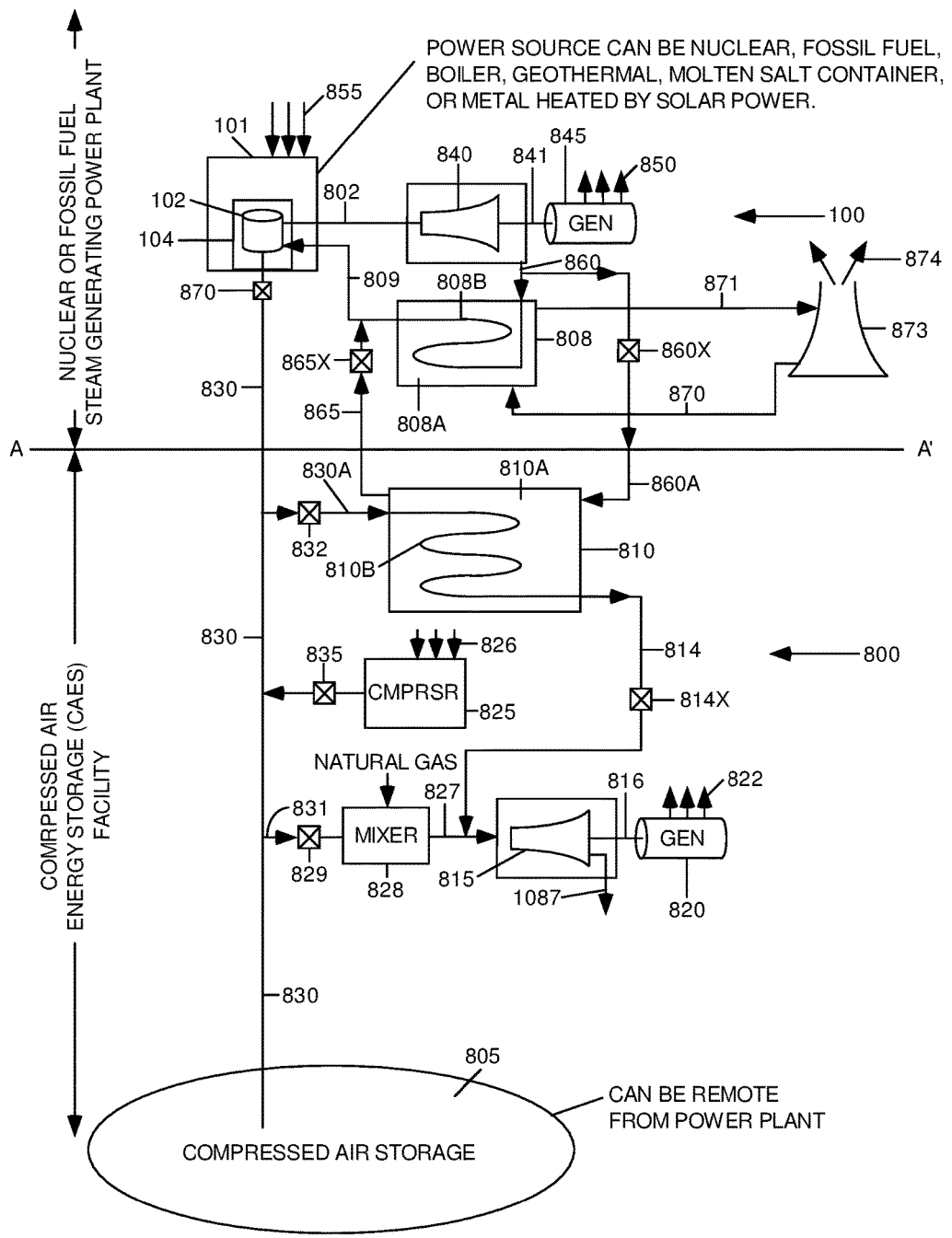
FIG. 8 is a schematic diagram showing a NCAP system.

The system of FIG. 8 et seq. shows the NCAP system. The NCAP system combines an ordinary thermal power plant and a compressed air energy storage (CAES) facility to alleviate the problems and deficiencies of existing, old-style CAES systems. The NCAP system uses the waste heat generated by a thermal power plant (TPP) to replace the large amount of natural gas energy used by old-style CAES facilities to provide the HOE for the expanding compressed air. The connection of a standard thermal power plant and a nearby CAES provides a "new style" CAES that is much more cost efficient and non-polluting. In addition, the NCAP system allows conversion of some of the TPP's waste heat into useful power. Also, when the TPP plant is a nuclear plant, the NCAP system provides another measure of safety during a nuclear emergency. The large amount of stored compressed air in the companion CAES of the NCAP system can be directed into the reactor vessel during an emergency to cool the fuel rods, thereby preventing a meltdown disaster like Fukushima. The NCAP system uses existing hardware and infrastructure that can be combined and installed quickly on many electrical grids all over the world.

FIG. 8 shows, for example, a TPP 100 with RPV 102 within a building 101. RPV 102 can also be a boiler that runs on fossil fuel, geothermal energy, gas, or molten salt or metal heated by solar power. It produces high pressure steam in line 802 that carries the steam into steam turbine 840. Below line A-A' is an old-style CAES 800 which uses natural gas in a mixer 828 to supply the heat of expansion to the compressed air entering turbine 815. Heat exchanger 810 that of the NCAP system is also shown in FIG. 8.

Prior to discussing the NCAP system, the operation of TPP 100 and CAES 800 without the NCAP apparatus will be described. TPP 100 can operate on fossil fuel, biomass, geothermal, or solar energy, as well as nuclear energy. In this example, TPP 100 is a steam-generating power plant which generates high-pressure steam that is supplied from RPV or other type of boiler to turbine 840 that drives a generator 845. Exhaust steam 860 (the waste heat fluid) comes out of the steam turbine 840 on line 860. The fluid in exhaust line 860 has a pressure of at least 2 bar and a temperature of at least 120° C. A "condenser" (heat exchanger) 808 cools the exhaust steam in line 860 and then returns the resulting condensate water 809 to the TPP's boiler. Virtually all of the heat in this steam is exhausted into the environment. (The external cooling medium for the secondary side of the condenser, heat exchanger, 808, usually cooling water, is not shown). This is the usual configuration for a standalone TPP plant.

The waste heat generated and released to the environment by a TPP is conveyed in a waste heat fluid (WHF), such as steam or hot water, hot exhaust gases from a gas turbine, or molten metal used to store energy. Forty to sixty percent of the thermal energy generated in a TPP plant is waste heat. Ninety percent of the power plants in the world are steam generating TPPs. In all such plants thus far, more thermal energy is exhausted into the environment than is converted into useful electrical power.

The apparatus below line A-A' is an old-style CAES plant 800 with an added heat exchanger 810 and appropriate conduits and valves to make it part of the NCAP system. The addition of the heat exchanger 810 to make the NCAP system can be ignored temporarily. When valves 860X, 865X, 832, and 814X are closed, FIG. 8 is a conventional TPP plant above line A-A' and an old style CAES below line A-A'. When valve 829 is open, the old-style CAES 800 uses a mixer 828 to mix natural gas with the incoming compressed air 831 before it ignites and expands in air turbine 815 to drive generator 820.

When valve 829 is closed and valves 860X, 865X, 832, and 814X in FIG. 8 are open, CAES 800 is connected to TPP 100 through a heat exchanger 810 that supplies the waste heat from TPP 100 to replace the natural gas energy used in the old-style CAES configuration described above. The heated compressed air 814 enters turbine 815.

The compelling fact is that a 300 MW CAES system needs external heat energy (HOE) added to its compressed air released so it can produce electrical power with an air turbine. An ordinary fossil fuel 500 MW electric steam-generating power plant (1250 MW thermal operating at 40% efficiency) exhausts at least 750 MW of waste heat (60%) into the environment. (Almost 60% the thermal power generated in the world is exhausted into the atmosphere).

The full details of how TPP 100 and CAES 800 are connected to make the NCAP system in FIG. 8 are described in detail below, but the main modifications are as follows: A relatively inexpensive heat exchanger 810 is provided and is connected to receive waste heat from turbine 840 via valve 860X and return the condensate on line 865 and valve 865X. Thus, some of the formerly wasted heat generated by the TPP is transferred to heat exchanger 810 where it is used to heat the compressed air 830 coming out of tank 805 of the CAES 800. Heat exchanger 810 is a multi-stage exchanger similar in design to the heat exchangers used at all thermal power plants to carry away the waste heat generated by the TPPs. More details of exchanger 810 are provided in FIG. 9. Heat exchanger 810 simply transfers some of the TPP's waste heat to the compressed air instead of allowing it to exhaust into the atmosphere. I.e., the NCAP system simply utilizes this free waste heat to satisfy the heat energy requirement of a companion CAES, thereby eliminating the need for costly and polluting fossil fuel to heat the compressed air and converting some of that TPP waste heat into useful power.

The CAES stores energy in the form of compressed air in a reservoir or tank 805. This tank does not have to be located very close to the TPP in the NCAP system. Instead, the tank can be located remotely from the TPP, even at long distances therefrom. The compressed air can be transported (piped) long distances from its reservoir 805 to the companion TPP plant just as easily as piping natural gas to the CAES facility. There is no heat loss because the stored isothermal compressed air is at ambient temperature. Likewise, the renewable energy generation can be far away from either the CAES or the TPP. The renewable energy is normally transmitted as electrical power 826 over the gird to drive the compressor 825 that charges the CAES air reservoir at some other location on the grid.

Potential underground air reservoir sites exist near many TPP power plants at all latitudes around the world. It has been estimated that underground CAES air reservoirs could be located under 80% of the land area of the U.S. That means there can be CAES facilities near most of the thousands of thermal power plants. And a CAES storage facility can be many miles distant from its companion power plant.

Detailed Explanation of NCAP System—FIGS. 8-13

For easy comparison and explanation, FIG. 8 shows all the apparatus in both an old-style CAES with the additions of the new NACP system. The valves marked "X" control the flow of fluids and transform the apparatus into one of the two different systems.

The apparatus below line A-A' is a CAES plant 800 with underground compressed air storage tank or reservoir 805. CAES 800 has its own compressed air turbine 815 and electrical generator 820 for returning its stored energy to the grid. Plant 800 also has a compressor 835 powered by electrical grid lines 826 for filling or charging tank 805. Tank 805 will normally be charged by off-peak power or renewable energy transmitted over gird lines 826 to power compressor 815.

An old-style CAES system is formed when valve 829 is open and valves 832, 870, 814X, and 860X are closed. Under these settings, TPP 100 and CAES 800 are not connected in any way. High-pressure compressed air is stored in reservoir 805 at about 70 bar (1000 psi), but can be between about 35 bar (500 psi) and 200 bar (2000 psi). The high-pressure air enters mixer 828 where it is combined with natural gas at about the same pressure. The natural gas provides the HOE for the compressed air entering turbine 815. The combination is ignited and expands in turbine 815 to drive an electrical generator 820. This is the configuration used in the existing McIntosh and Huntorf CAES systems.

When valve 829 is closed and valves 832, 860X, and 814X are open, the CAES apparatus below line A-A' is transformed into part of the NCAP system. Some of the waste heat fluid (WHF) in line 860 from TPP 100 (the output of turbine 840) is directed into heat exchanger 810 to heat the high-pressure compressed air entering through valve 832 and circulating in conduit 812 within heat exchanger 810. The heated compressed air leaves heat exchanger 810 via conduit 814 and is then directed to air turbine 815, which drives its generator 820 to produce electrical power.

Since it has been heated by the WHF, it will have the necessary HOE to expand and will not freeze the equipment or surrounding area. The power from generator 820 is returned to the gird over lines 822. Natural gas is no longer needed to heat the expanding compressed air from tank 805. In the NCAP configuration, mixer 828 in FIG. 8 is not used or does not exist. Thus, the NCAP system uses the free waste heat from TPP 100 to eliminate the great expense and pollution generated by using fossil fuel energy to provide the HOE to the compressed air in old style CAES facilities. In addition there are other major benefits, described below.

At peak power demand times on most electrical grids, TPP 100 in the NCAP system of FIG. 8 will normally be running at full power output (and maximum waste heat production). This is also when the stored energy in CAES 800 is also desired. This means that maximum TPP waste heat will be available when the CAES facility needs it to return the CAES stored energy to the grid.

The NCAP Heat Exchanger

Gerard, supra, shows a multi-stage heat exchanger and air turbine. Gerard uses water at ambient temperature to heat the compressed air going into each turbine stage. In contrast, heat exchanger 810 in the NCAP heats the compressed air entering each stage of a multi-stage air turbine with higher temperature waste heat fluid (WHF) from a TPP.

Figure 9:
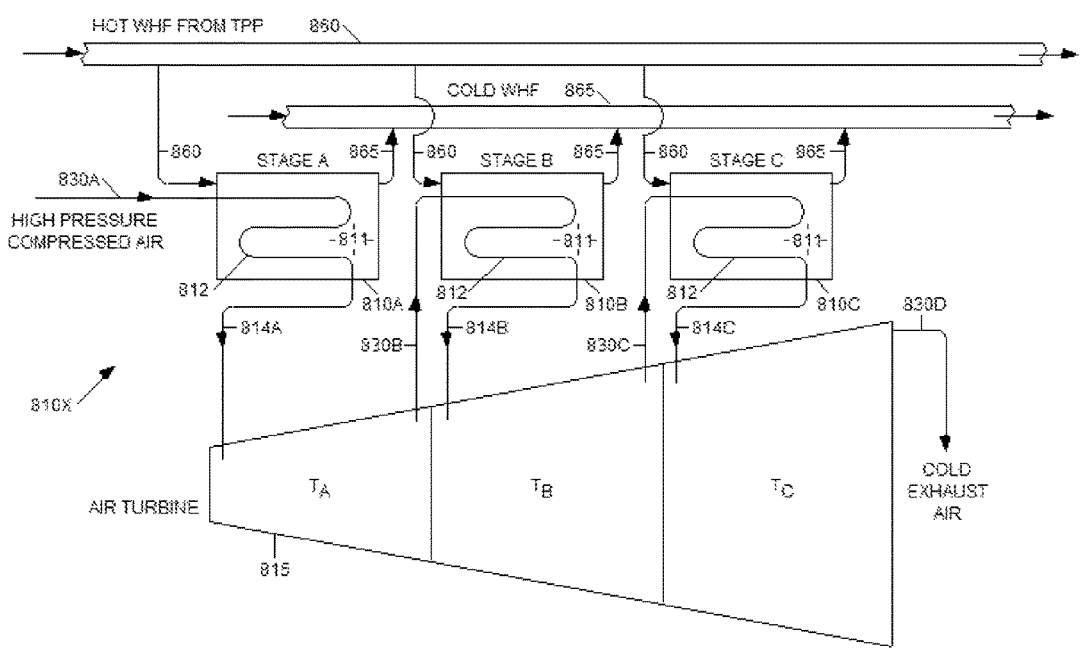
FIG. 9 is schematic diagram of a multi-stage heat exchanger.

FIG. 9 shows a three-stage heat exchanger 810X feeding a three-stage ($T_A$, $T_B$, and $T_C$) air turbine 815 in the NCAP system, although the turbine may have more or fewer stages. The temperature of the compressed air 814A, 814B, and 814C entering each stage of the turbine is raised by waste heat transferred to the compressed air by WHF 860 from TPP 100 flowing through heat exchangers 810A, 810B, and 810C. (WHF 860 from TPP 100 will typically be steam, hot water, hot exhaust gases, molten salt, molten metal, etc.). WHF 860 enters each heat exchanger stage 810A, 810B, and 810C and exits as cooler WHF 865 from each stage. Cooler WHF 865 returns to the boiler of plant 100. The compressed air flows through each heat exchanger stage in a sealed conduit 812 that is surrounded by hot WHF 860, thereby filling the heat exchanger's enclosure 811 inside the heat exchanger. The heated compressed air 814A, 814B, and 814C leaving each heat exchanger gains energy at each stage. The output of the final turbine stage 810D is cold air 830D because it expanded in turbine stage $T_C$.

The high pressure compressed air 830 in FIG. 8 enters the multi-stage heat exchanger as 830A. The heated compressed air 814A, 814B, and 814C from each heat exchanger stage enters its corresponding turbine stage $T_A$, $T_B$, and $T_C$ where it expands to produce power.

Cold exhaust air 830D is either sent back to condenser 808 of TPP 100 to further cool waste heat fluid 860 before it returns to plant 100 or 830D is sent to equipment for co-generation.

The flow rates of waste heat fluid 860 and compressed air 830A entering heat exchanger 810X are adjusted to provide the desired heat transfer rate for the expanding compressed air.

Conduit 812 inside each heat exchanger can be replaced by a number of tubes contained within a sealed manifold inside each heat exchanger. This will cause each tube containing compressed air to be surrounded by hot WHF 860 flowing through enclosures 810A, 810B, and 810C. This configuration of multiple tubes is common in exhaust steam condensing heat exchanger 808 in FIG. 8 of a typical steam TPP 100.

Combined Turbine and Generator for Power Plant and CAES

Figure 10:
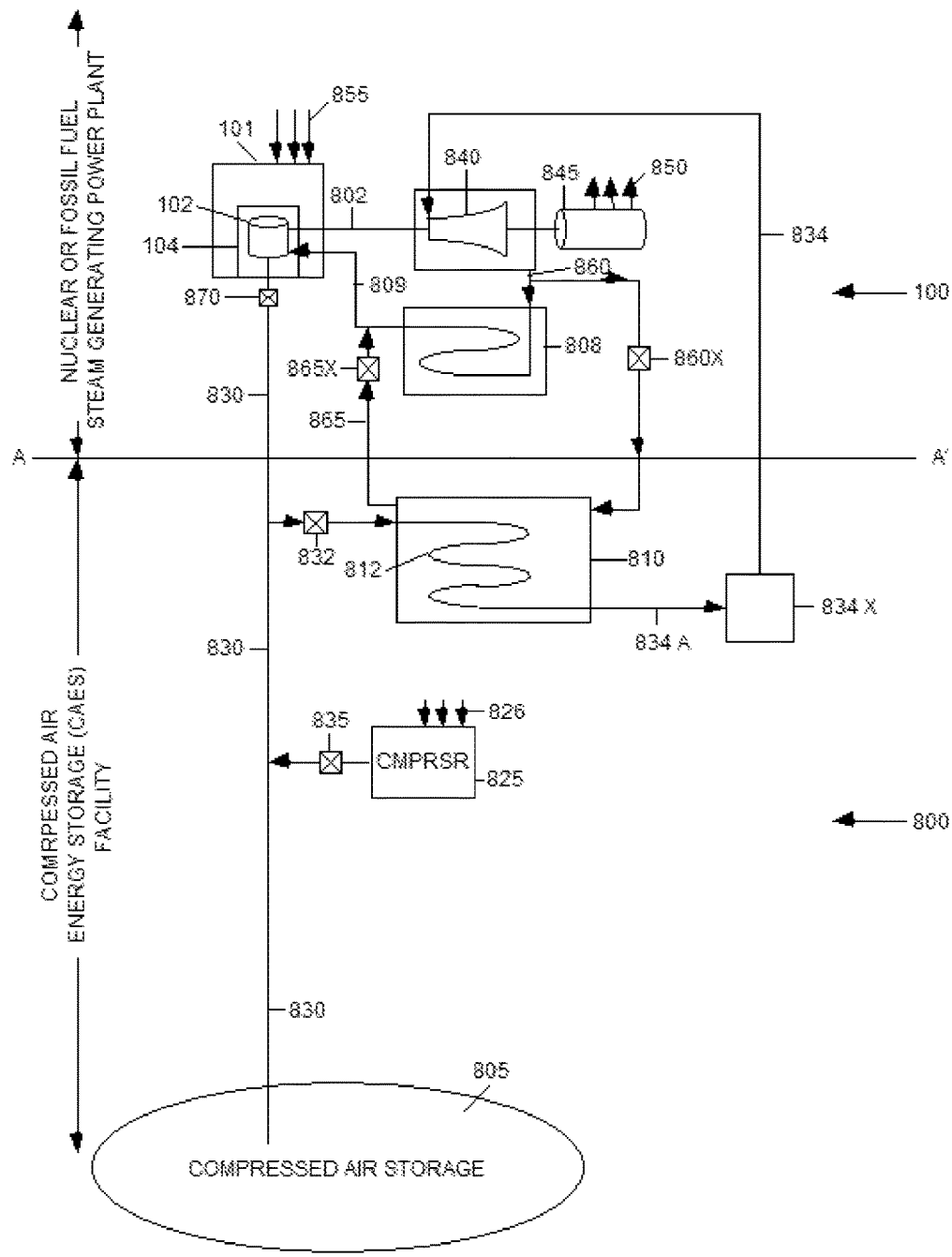
FIG. 10 is a schematic diagram of a NCAP system that combines the turbine and generator of a thermal plant with the turbine and generator of a CAES facility.

FIG. 10 shows an NCAP system that combines turbine 815 and generator 820 (FIG. 8) normally used by CAES 800 with turbine 840 and generator 845 in steam plant 100 (also FIG. 8). While the stand-alone CAES facility in FIG. 8 uses its own turbine 815 and generator 820 to convert the stored energy in the compressed air to electrical power, the system of FIG. 10 eliminates separate turbine 815 and generator 820 by combining them with the turbine and generator of the TPP 100.

Compressed air is released from CAES reservoir 805 (FIG. 10) to generate power for the grid to which the NCAP is connected. This air enters heat exchanger 810 through valve 832. Hot steam in turbine output line 860 from TPP 100 is sent to exchanger 810 through valve 860X. The compressed air is thus heated and leaves exchanger 810 through line 834A. When valve 834X is open, the heated compressed air flows into line 834 that enters steam turbine 840 of TPP 100 at a stage position appropriate to the pressure of the compressed air in line 834. Heated compressed air 834 entering turbine 840 will normally be in the range of 600 to 1000 psi. Compressed air 834 will normally be combined with TPP steam 802 at a similar pressure at some stage of the turbine 840. Using the standard re-heat cycle in modern fossil fuel TPP plants, the lower pressure steam coming out of the first stage in multi-stage turbine 840, plus compressed air 834 added to it, may be re-heated by exhaust gases from the boiler before reentry into a lower pressure stage of the turbine. This brings air 834 to a higher temperature that is compatible with the steam entering turbine 840.

The system of FIG. 10 is most appropriate for new steam plant installations where turbine 840 can be designed to accommodate both steam from TPP 100 and compressed air from CAES 800. In an optimized turbine design the compressed air in line 834 will enter turbine 840 in several sequential "pressure stages" so that the exhaust from one stage is reheated before entering the next stage at a lower pressure (FIG. 9). This is a common design used in other applications of compressed air energy. The generic multi-stage heat exchanger 810 in FIG. 9 can be placed close to or around turbine 840 to allow reheating of multiple stages of compressed air at sequentially lower pressures.

Other Important Features and Benefits of the NCAP System:

Power Plant Waste Heat is Converted into Useful Power with NCAP System

In addition to using free waste heat from a TPP to heat compressed air (described in FIGS. 8 to 10), the NCAP system provides another major benefit that has not been realized in any previous systems or designs for power generation by fossil fuel or nuclear power plants. In FIG. 8, most of the TPP's waste heat 860 transferred to the CAES compressed air 814 is converted into useful power when the heated compressed air 814 expands in a turbine 815 to produce electricity. With a very large CAES absorbing most of the waste heat from a TPP, the energy efficiency of the companion TPP plant can be improved substantially when the CAES is delivering its power to the grid. The only other ways that TPP low temperature waste heat has been used is with co-generation plants that use the low-temperature waste heat fluid 860 as process steam in chemical plants and/or to heat or cool buildings. The exhaust steam 860 from a fossil fuel or nuclear power plant TPP is too low in temperature to drive a turbine and/or otherwise generate mechanical work. No other prior art designs actually convert the low-temperature waste heat 860 from a fossil fuel or nuclear TPP into useful electrical power as is accomplished by the NCAP system.

Cooling Water Saved

When TPP 100 (FIG. 8) is a steam generating plant that drives a steam turbine, the NCAP system also reduces the amount of external "cooling water" that is needed to cool steam condensate 860 returning to plant 100 when the CAES is returning its energy to the grid. The heat exchanger 810 extracts heat from the exhaust steam 860 (this is the waste heat fluid WHF). In many TPP, the cooling of exhaust steam 860 is done with fresh water circulating in the standard heat exchanger 808. The cooling water is then cooled by evaporation in cooling water towers that dissipate large amounts of the water into the atmosphere (8). Ninety percent of the power plants in the world are steam generating TPPs. If even 20% of the waste heat from a 1000 MW TPP is taken by a companion CAES when it is operating for ten hours per day, 10,000 gallons of fresh (cooling) water can be saved each day. This amounts to 3,650,000 gallons per year. Conserving the cooling water used by power plants is an important feature. There are predictions that many power plants around the world will be limited in production in future decades because of a shortage of local cooling water.

NCAP Provides Backup Emergency Power for Nuclear Plants

There is another feature inherent in the NCAP system for a nuclear plant. If the Emergency Core Cooling Systems (ECCS) safety systems in a nuclear plant are functional but the plant has lost power from the grid and its emergency backup power is disabled (as happened at Fukushima), a companion CAES facility with its own turbine and generator can immediately supply the emergency electrical power needed by the ECCS systems in the companion nuclear plant. Unlike a nuclear plant turbine and generator, the power output from a CAES facility can be controlled quickly to match the power demand of the electrical pumps and equipment in a standard ECCS system. A standard ECCS system in a nuclear plant continues to circulate the hot water and steam generated by the decay heat in the reactor and cool this hot water and steam in a heat exchanger that transfers the reactor heat to the environment. Hence, this waste heat is still available for the compressed air in a CAES (in FIG. 8) that is supplying emergency power to the nuclear plant ECCS.

Compressed Air from a CAES can be Piped to Remote NCAP Companion TPP Plant

The CGES compressed air reservoir 805 in the NCAP system of FIG. 8 does not have to be very close to its companion TPP 100. The isothermal compressed air from the CGES reservoir 805 can be piped to a TPP 100 located remotely (about one to about 20 km) from the TPP since the compressed air can be transported to the TPP as easily as transporting natural gas the same distance. E.g., oil well operators in the Permian Basin in Texas pipe large amounts of pressurized $CO_2$ at ambient temperature from New Mexico (over 200 miles) to be used for enhanced oil recovery (EOR). Air turbine 815 (FIG. 8) that transforms the compressed air into electricity must be located at TPP 100 so that waste heat 860 from TPP 100 can be transferred to the compressed air by heat exchanger 810. While compressor 825 is best located at compressed air reservoir 805 if power lines are available to power the compressor, it can also be located at TPP 100. In the latter case, the compressed air must be transported in both directions, to and from reservoir 805. This flexibility allows a CAES reservoir to be anywhere within hundreds of square miles around a TPP.

Renewable Energy Generation can be Far from CAES Storage on Same Grid

In similar fashion to the location of CAES air reservoir 805 (FIG. 8) far away from its companion TPP in the NCAP system, renewable wind and solar energy sources do not have to be close to the CAES reservoir 805 that stores their energy if they are all connected to the same electrical grid. The renewable energy can be transported over the gird to the compressor 825 that charges the air reservoir in FIG. 8. Hence, in the NCAP system the only things that must be co-located at the companion TPP plant are the heat exchanger 810 and the air turbine that converts the heated compressed air to electricity. Electrical grid transmission lines are available at all TPP plants to allow remote location of the other facilities in the NCAP system.

Small TPP Power Plant is Sufficient for Large NCAP Renewable Energy Storage System The 40 to 60% waste heat from even a small steam generating or gas turbine power plant (300 to 400 MW) is more than sufficient to supply the heat of expansion needed by a large CAES facility in the NCAP system of FIG. 8. For example, a small 300 MW combined cycle gas turbine TPP operating at 60% efficiency will produce (continuously) at least 200 MW of waste heat. The common 1000 MW nuclear TPP can supply a CAES that produces at least 3000 MW, which would be an enormous CAES (so far, the largest CAES proposed is 500 MW).

Comparison of NCAP with Molten Metal and Battery Energy Storage

The best comparison of different energy storage systems is to compare their megawatt-hours (MWH) of energy returned to a grid. The Crescent Dunes facility in Nevada (6) is a large solar thermal generating plant that uses molten salt as a storage medium. It is advertised to store 1100 MWH of energy (3960 GJ). The existing McIntosh CAES facility in Alabama that has been operating since 1999 stores 2860 MWH (10,290 GJ). Thus the McIntosh stores two and one half times as much as the Crescent Dunes molten salt facility. Newer CAES systems on the drawing board will store four to five times as much as the McIntosh CAES. These CAES systems incorporated into the NCAP system will be able to cool a 1300 MW nuclear reactor well beyond the critical first three days after shutdown.

Existing CAES facilities store hundreds of times more energy than the largest battery energy storage facility, the Battery Energy Storage System in Fairbanks, Ak. New CAES systems being built are three to five times bigger than the existing McIntosh CAES facility. It is likely that newer CAES facilities will continue to be many times bigger than the largest battery storage facilities at similar cost.

NCAP System Provides ECCS when TPP is Nuclear Plant

There is an added benefit of the NCAP system when the steam plant (TPP) is a nuclear plant. The compressed air in the companion CAES facility can be used to cool the hot fuel rods in a nuclear reactor during a nuclear emergency when the internal ECCS is disabled (as happened at Fukushima). This feature comes at almost no additional expense once the NCAP system is built to provide a very profitable Renewable Energy Storage facility.

Figure 11:
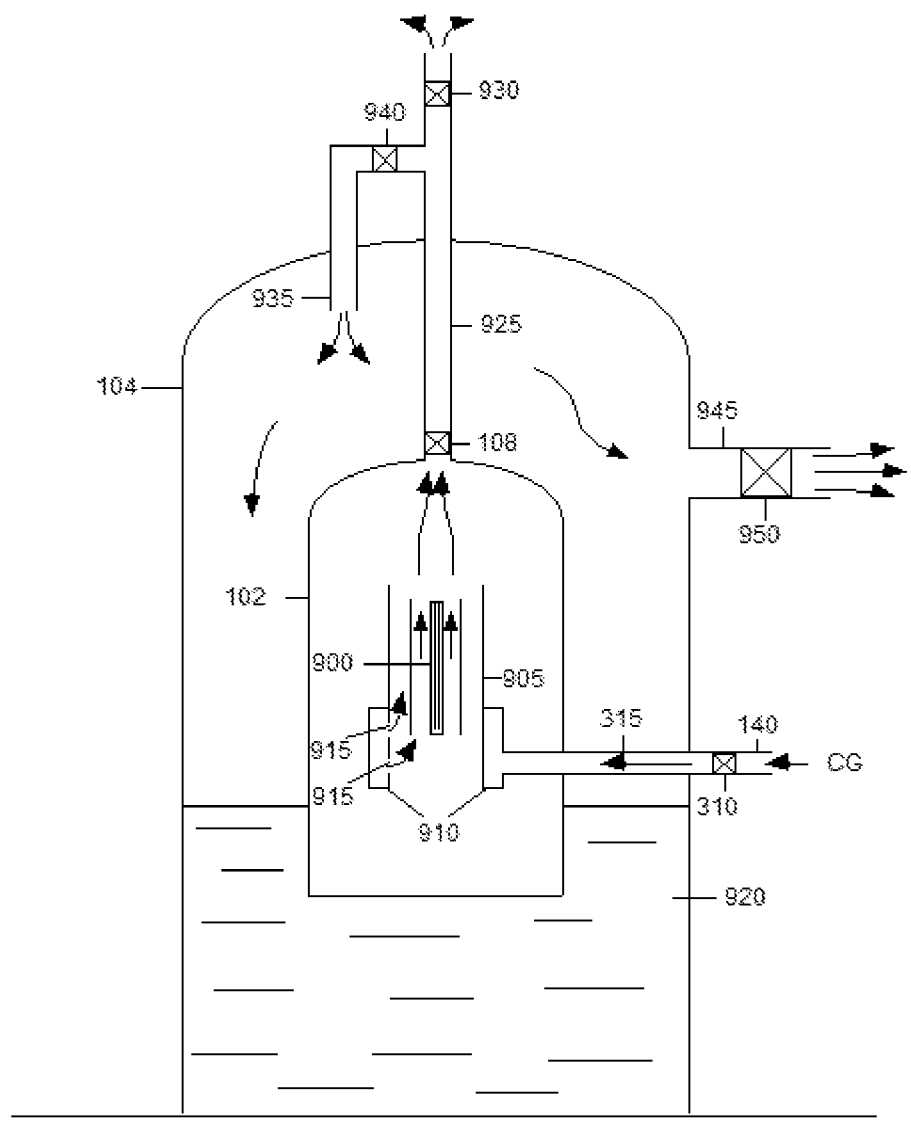
FIG. 11 is a schematic diagram of how CG is released inside a nuclear reactor pressure vessel to cool the fuel rods therein.
Figure 12:
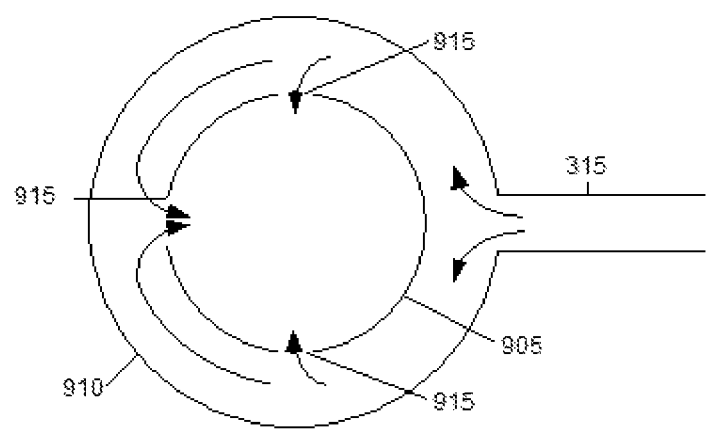
FIGS. 12 and 13 show the CG paths inside a nuclear reactor to cool a reactor after a SCRAM.
Figure 13:
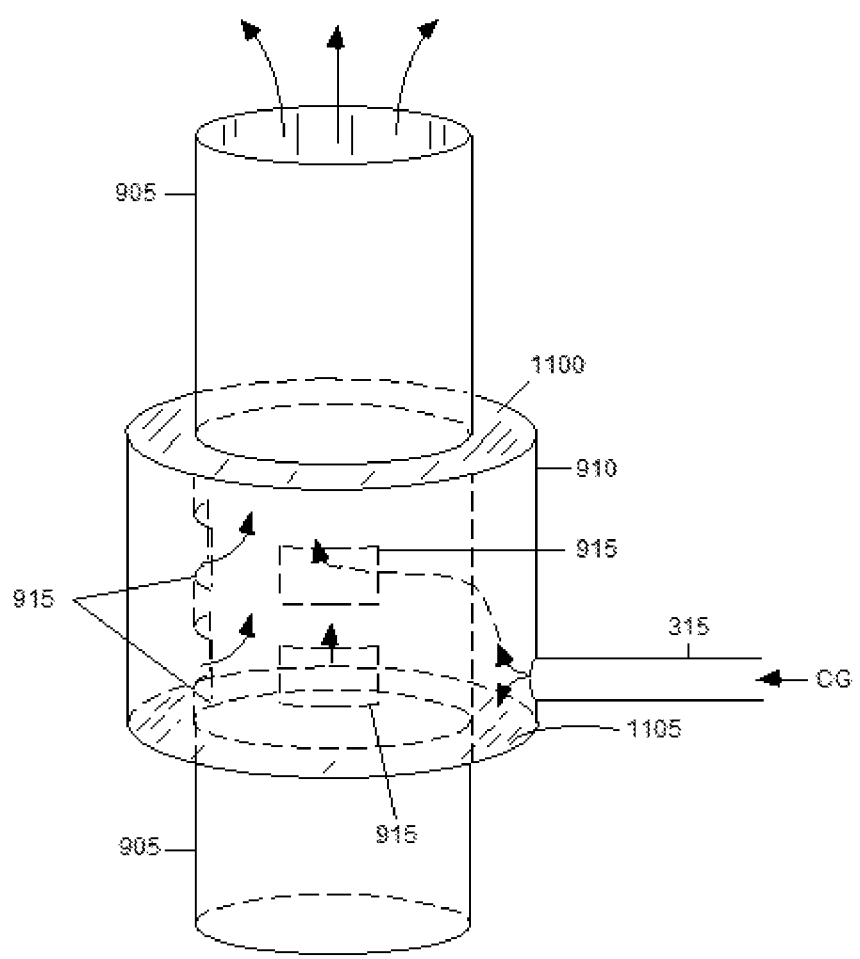

Opening valve 870 in FIG. 8 allows the compressed air in line 830 from CAES reservoir 805 to flow directly into RPV (or other boiler) 102 and expand around the hot fuel rods. This compressed air ECCS system is a passive ECCS. I.e., it requires no other emergency power supply or energy source other than the compressed gas stored in the CAES facility. Thus, the NCAP operating as an energy storage system also provides at no extra cost a valuable ECCS safety system for a companion nuclear power plant. The compressed air ECCS by itself might not be built because of the cost if it were not used for another very profitable purpose such as a renewable energy storage facility. The details of this design feature are shown in FIGS. 11 and 12.

In a large 1300 MW electric nuclear power station with a nuclear reactor that produces 3900 MW of thermal heat energy, the decay heat from the reactor fuel rods immediately after the reactor shutdown is normally 7% of the rated 3900 MW thermal. This is equal to 273 MW immediately after shutdown; this reduces to 1.5% after one hour. This decay heat must be removed from the fuel rods. Otherwise, they will melt within a few hours. In a NCAP system using the existing McIntosh CAES, the compressed air in the CAES alone could cool a companion 1300 MW nuclear reactor for the critical first 24 hours or more after shutdown. Moreover it does this without using any cooling water. This is not a trivial consideration in light of what happened at Fukushima and could happen at any of the 420+ aging nuclear plants in the world in the future. The rescue crews at Fukushima were within a few hours of being able to restore internal cooling water circulation when the irreversible meltdown process began. A single CAES facility connected to the Fukushima reactors might have saved the day by giving them a few hours of reactor cooling.

New CAES facilities now being built are three to five times bigger than the McIntosh facility. They will be able to cool a 1300 MW reactor for more than three days—until it has reached cold shutdown.

For example, the energy to compress the air from 1 bar to 70 bar (1029 psi) stored in the McIntosh facility is approx. 15,600 GJ. (This is consistent with a total energy return to the grid of 110 MW for 26 hours (10,296 GJ) as advertised for the McIntosh facility.) Assume that the compressed air in the McIntosh facility will absorb 30% of its stored energy as heat if it is released to expand around the hot fuel rods in a vented nuclear reactor pressure vessel (RPV) during an emergency. (If the primary water circulation equipment has ruptured, the pressure in the RPV will be low). The decay heat absorption available is 30% of 15,600=4,680 GJ. The total decay heat from the fuel rods is 3220 GJ for the first 24 hours after reactor shutdown of a 1300 MWE nuclear reactor. Hence, in a NCAP system using the existing McIntosh CAES, the compressed air in the CAES alone can cool a companion 1300 MW nuclear reactor for the critical first 24 hours or more after shutdown. Again this is done without cooling water.

These values are used for explanatory purposes and are not intended to be limiting in any way. Those skilled in the art of nuclear power plant design will understand how to scale the emergency cooling requirements described herein to fit smaller and larger nuclear power plants.

Detailed Description of Baffle 905 and Manifold 910—FIGS. 11 and 12—Gas Path Inside a Reactor—FIG. 11.

FIG. 11 is a schematic diagram that shows one embodiment of the compressed gas emergency core cooling system (CGECCS) inherent in the NCAP system of FIG. 8. Compressed air (CG) from storage cavern 805 is injected directly into RPV 102 during a nuclear emergency. When valve 870 is opened and valves 829 and 832 are closed, CG flows directly from reservoir 805 into the RPV. In FIG. 11, a plurality of fuel rods 900 inside the RPV are positioned within a baffle 905, a tall, cylindrical structure that surrounds rods 900. Such baffles are commonly used to shield the inner wall of the RPV from neutron radiation coming from the fuel rods and for channeling the primary heat transfer water around rods 900 during normal operation. A closed, cylindrical manifold 910 is tightly mounted outside and around a lower portion of baffle 905. Pipes 140 and 315 deliver CG to manifold 910 when valve 310 is opened during a nuclear emergency. CG leaves manifold 910 via a plurality of openings 915 into baffle 905. The CG expands in the volume surrounding rods 900. Manifold 910 is described in greater detail in FIG. 12. The CG expands as it flows out of manifold 910 and over rods 900, thereby extracting heat from the fuel rods. The expanded CG exits via pipe 925, either into the atmosphere outside PCV 104 or into PCV 104, or both. Gases within PCV 104 are vented to the atmosphere via pipe 945 when valve 950 is opened. PCV 104 can contain a pool of suppression water 920 surrounding the RPV up to a predetermined level.

The RPV can also be a spent fuel rod containment vessel (not shown) in which the spent fuel rods are surrounded by water (a water bath storage) until they cool. In this case, the CG could be used in the same fashion as described herein for an RPV in case the water is lost from the fuel rod containment and there is a danger of the fuel rods catching on fire and releasing radioactive material (as nearly happened at Fukushima).

In FIG. 11, valve 108 is the safety relief valve on the RPV that opens when pressure in the RPV exceeds the maximum allowable level. Relief valve 108 can be opened to vent CG and/or steam out of the RPV if necessary. When the standard ECCS systems in a SCRAMMED plant 100 are disabled, valve 108 normally will be opened to vent fluids in the RPV and allow injection of cooling fluids into it. (However, this was not done during the Fukushima accident until it was too late.)

A pipe 925 conducts fluids from the RPV. Valve 930 releases fluids into the atmosphere when it is opened. Another pipe 935 branches from pipe 925. A valve 940 in pipe 935 vents fluids into PCV 104 when it is opened. When desired, valves 925 and 940 can be opened at the same time, venting fluids into PCV 104 and the atmosphere outside the RPV. An additional pipe 945 and valve 950 are provided to vent fluids from PCV 104 when valve 950 is opened.

FIG. 12 is a top view of manifold 910 and baffle 905. CG enters manifold 910 via pipe 315 and flows inward via a plurality of openings 915 in baffle 905. The fuel rods are contained inside manifold 910 as shown in FIG. 11.

The feasibility and utility of the NCAP embodiment is demonstrated by the fact that the stored CG in a large CAES facility, such as the one in Huntorf, Germany, can cool the fuel rods in a 3900 MW thermal reactor for at least three days with no regeneration of the CG in its storage unit 805 (FIG. 8). In addition, the CAES can begin delivering enormous quantities of CG very quickly—within minutes—to handle the immediate maximum decay heat (7% of rated thermal power) that must be removed to avoid damage to the fuel rods in a companion nuclear plant in the NCAP embodiment.

It can be expected that either standby electrical generators or air compressors will be available within three days to regenerate the CG in cavern 805 (FIG. 8) so that reactor cooling can continue indefinitely. The expanding CG can bring a nuclear reactor to cold shutdown condition (fuel rods under 100° C.). Note that only the passive energy in the large CG cavern 805 is necessary to provide a security blanket of emergency cooling for nuclear plant 100 in FIG. 8.

The unique nature of the NCAP is demonstrated by the fact that the nuclear power industry heretofore has not utilized this tremendously valuable safety enhancement plus the great operational cost savings available by connecting a relatively inexpensive CAES system to a nuclear plant to implement the NCAP system as shown in FIG. 8. The standard ECCS systems in existing nuclear plants that utilize internal cooling water cost far more than a companion underground CAES facility at most locations.

The Fukushima nuclear meltdowns in 2011 would not have happened if the reactors had been connected to even one inexpensive CAES power plant as described for the NCAP embodiment. Fifty billion dollars or more of loss could have been prevented with the addition of the 100 million dollar CAES plant shown in FIG. 8.

The "safety blanket" for nuclear power plants provided by the NCAP embodiment of FIG. 8, as described in FIGS. 11 and 12, is extremely valuable. This degree of safety has not been available for land-based nuclear reactors by any other means. The cost of a large CAES compressed air underground storage system is less than 3% of the cost of a typical nuclear power plant. The availability of a 100 million dollar or less CAES during a nuclear emergency can avoid the loss of a 10-billion-dollar nuclear plant and the tens of billions of additional cost for environmental damage and clean up, not to mention the cost of injuries and loss of public confidence in nuclear power. Further, a CAES plant connected to a nuclear plant as shown in the NCAP system of FIG. 8 pays for itself many times over as a utility-scale renewable energy storage facility that can be used every day.

Cooling Fuel Rods in a Ruptured RPV

The NCAP combined nuclear plant and compressed air energy storage embodiment is the only ECCS that can cool a reactor after the RPV has been damaged to the point that it cannot hold any cooling water around its fuel rods. In fact, the NCAP works best under this severe condition. A ruptured RPV allows full expansion of the CG injected around the fuel rods (and maximum decay heat extraction) without any pressure build up in the RPV. All ECCS systems that rely on cooling water, including the AP1000, cannot stop a meltdown in a nuclear power plant with a ruptured RPV or primary circuit that is damaged such that cooling water cannot be circulated.

Serious corrosion was discovered in the thick steel lid of at least one older U.S. nuclear reactor RPV. That lid was very close to rupturing. Had that occurred under operating pressure, all internal ECCS systems (and operators) in that nuclear plant would have been disabled. Even a plant using the AP1000 design would have been helpless to avoid a meltdown. With hundreds of aging reactors around the world, it can be expected that more such events will happen in time.

CAES systems are now being planned will use long segments of high pressure pipe on the ground to replace underground caverns for storing large quantities of CG. This CG storage can be installed easily in the open areas around most nuclear power stations. The use of a high-pressure pipe for CG storage in FIG. 8 would provide the NCAP emergency cooling for a reactor even if the CG stored is not used for peak power production, as in a full CAES peak power plant.

CONCLUSIONS, RAMIFICATIONS, AND SCOPE

In order to moderate climate warming, the world needs thousands of inexpensive, large capacity, non-polluting Renewable Energy Storage (RES) facilities in order to capture and utilize the enormous amount of untapped wind and solar renewable energy available. It is imperative that the aging nuclear power stations of the world be provided enhanced safety systems as soon as possible. There are only a few large CAES energy storage facilities operating today. The NCAP system described herein provides both of these necessities in the form of cost-effective, utility-scale compressed air energy storage systems. The NCAP system has the following specific advantages:

The NCAP system (ironically) uses and converts the (free) waste heat from a companion thermal power plant to provide a compressed air energy storage (CAES) facility that is cost effective and emits no additional $CO_2$. The NCAP system actually converts some of the TPP plant waste heat into useful power. No prior CAES designs can do this. The NCAP system can be built all over the world using only existing, proven infrastructure—and it can be done in a few years' time, not decades from now.

The NCAP Emergency Core Cooling System (ECCS) feature using stored compressed air from a large CAES can carry out the reactor cooling operation under worst case conditions that cannot be handled by any of the existing ECCS systems approved or in nuclear plants today. The NCAP system can cool a water-cooled reactor in the most extreme case, i.e., where all primary coolant has been lost and the internal plumbing connected to the reactor has been damaged such that even new cooling water cannot be circulated through the reactor's "primary boundary" by the in-plant equipment. Also, a reactor pressure vessel (RPV) can be cracked such that it cannot hold high-pressure water or steam.

All embodiments of the CGES external, add-on safety systems for nuclear power plants use stored compressed air to inject external cooling fluid directly into a RPV under relatively low-pressure conditions. The cooling fluid injected does not have to be retained long-term in the RPV under high pressure. The injected coolant absorbs decay heat as it passes through the RPV. Then it is vented directly out of the reactor to the primary containment vessel (PCV), and-or empty external water tanks, and-or the environment. All the CGES embodiments utilize small, inexpensive tanks to store the compressed air and the cooling water that is not pressurized until it is needed.

All embodiments can bring a nuclear reactor to cold shutdown condition and cool it indefinitely thereafter with recharging of cooling fluids.

The systems can be installed immediately from robust, reliable components that are available worldwide without the development and certification of new technology.

All embodiments are compatible with and can add to the capability of existing ECCS systems if the existing systems are capable of operating to some degree after a nuclear power station has been shut down.

None of the embodiments described require extensive regulatory agency approval or delay. They can be installed outside a nuclear power station with physical connection only to the existing external cooling water input port(s) and output fluid venting port(s) on all nuclear RPVs. They are the equivalent of parking fire trucks loaded with water outside a nuclear plant. Installation can be done without significant interruption of nuclear power station operation. No new or unproven technology is required to construct any of these embodiments.

Various embodiments of the CGES system can be installed outside the buildings and infrastructure of a nuclear plant where they are relatively safe from destruction by acts of nature and-or terrorists that can disable the internal ECCSs in use today (as happened at Fukushima in 2011). The embodiments described all contain their own power system in the form of stored high-pressure CG that is more reliable and robust than fragile electrical generators (which have failed recently at U.S. nuclear plants) or DC battery banks. The embodiments described are all passive safety systems. All embodiments shown can bring a nuclear reactor to a cold shutdown condition and cool it indefinitely thereafter with recharging of cooling fluids.

All embodiments of the CGES can be tested at any time without interruption of power generation at a nuclear plant. A large number of nuclear plants have been shut down since the Fukushima accident in 2011. Owners are now planning to start up some of these plants. Installation of one or more of the embodiments of the present system can be tested thoroughly on any idle plant before it is reactivated by injecting cooling fluid into the RPV. This would demonstrate enhanced safety to the press and public in a manner that they can understand.

The NCAP system provides the inexpensive, utility-scale renewable energy storage system that world has been seeking to allow use of a great deal more wind and solar energy on existing electrical grids. It creates no new expense or pollution beyond what is already being produced by an existing companion TPP plant. Prior designs do not have the capability of converting some of the TPP plant waste heat into useful power through the medium of the compressed air and thereby improve the efficiency of the TPP plant. All prior CAES systems use some heat source that adds substantial capital cost and/or operational expense and/or emits extra pollution to the operation of the CAES. Most prior designs burn natural gas in a gas turbine of some sort to provide the heat of expansion (HOE) needed by the compressed air which adds substantial $CO_2$ to the atmosphere. However, because of the great need for renewable energy storage, new CAES facilities are being planned that are old style because they propose using natural gas to heat the stored compressed air. Large reductions in cost and pollution generated can be accomplished if these new CAES facilities are connected to thermal power plants to implement the NCAP system.

When the companion TPP plant in a NCAP system is a nuclear power plant, the compressed air in the CAES reservoir provides the means to cool the nuclear reactor during an emergency at no almost no additional cost to the facility that produces power on a continuous basis.

When a TPP is a steam generating plant that drives a steam turbine, the NCAP system also reduces the amount of external "cooling water" that is needed to cool the steam condensate returning to the plant when the CAES is returning its energy to the grid. The NCAP's additional heat exchanger transfers heat from the exhaust steam or waste heat fluid to the compressed air, thereby reducing the amount of cooling water needed to cool the exhaust steam and condense it to feed water that is returned to the boiler. Thus the size of the cooling water towers and the evaporative water loss can be reduced. This is a substantial advantage since 90% of the power plants in the world are steam generating TPPs. If even 20% of the waste heat from a 1000 MW TPP is taken by a companion CAES when it is operating for ten hours per day, 45.5 kilo-liters or 10,000 gallons of fresh (cooling) water can be saved each day. This amounts to 3,650,000 gallons or 16,607.5 kilo-liters per year. There are predictions that many power plants around the world will be limited in production in future decades because of a shortage of local cooling water.

The NCAP system provides a roadmap for developing countries to leap beyond building more fossil fuel power plants (right now) by greatly expanding their renewable energy generation and/or greatly improving the safety of nuclear power plants. Almost every electrical grid in the world includes one or more large TPP plants, usually a fossil fuel or nuclear steam generating plant that can be the companion CAES facility for a NCAP system. The combination of a large CAES facility connected to a nearby TPP power plant makes the NCAP system an ideal Renewable Energy Storage facility that can be used around the world—and allow the capture of ten times more wind and solar renewable energy on a continuous basis. Using some existing TPP plants to implement NCAP systems will allow grids to forego building more fossil fuel TPP plants.

There is no energy storage facility in use today or in prototype testing that can match the NCAP system for a compressed air storage (CAES) as measured by 1) very large capacity, 2) inexpensive per megawatt-hour (MWH) of storage, 3) very robust and reliable, 4) does not emit $CO_2$ to the atmosphere, 5) uses no toxic materials for energy storage that can be a danger to the environment, 6) can be built immediately using existing technology that has been thoroughly tested, and 7) appropriate for use all over the world.

The total cost of building the test equipment and field testing the NCAP Renewable Energy Storage system as described above should not exceed two million dollars if the owner of a steam plant will allow the connection of a basic heat exchanger 810 as shown in FIG. 8. Compare this to the many hundreds of millions of dollars being spent every year on Renewable Energy Storage prototypes using batteries, molten metal, and chemical processes that can store only a fraction of the energy stored in the existing CAES facilities at McIntosh, Ala., and Huntorf, Germany.

While the above description contains many specificities, these should not be construed as limitations on the scope, but as exemplifications of some present embodiments. Many other ramifications and variations are possible within the teachings.

Thus the scope should be determined by the appended claims and their legal equivalents, and not by the examples given.

The invention claimed is:

1. A thermal power plant, comprising:
a source of primary high-pressure heated fluid configured to drive a primary turbine,
a primary turbine configured to receive said high-pressure heated fluid configured to drive a primary electrical generator,
a primary electrical generator configured to be driven by said primary turbine and configured to produce primary electrical power,
said primary turbine having an outlet configured to convey exhaust fluid from said primary turbine,
a compressed-air tank configured to hold a quantity of compressed air,
a secondary heat exchanger configured to receive compressed air from said compressed-air tank and at least some of said exhaust fluid from said primary turbine and configured to supply heat from said exhaust fluid to said compressed air to heat said compressed air,
a secondary turbine configured to receive said heated compressed air from said secondary heat exchanger and configured to produce mechanical power from said heated compressed air as it expands in said secondary turbine, and
a secondary electrical generator configured to receive said mechanical power from said secondary turbine and configured to generate secondary electrical power,
whereby some of the heat energy in said primary exhaust fluid is converted into additional mechanical power by said secondary turbine and the amount of cooling water required to cool said exhaust fluid from said primary turbine is reduced.

2. The thermal power plant of claim 1 wherein said source of said primary high-pressure heated fluid is a nuclear reactor having a reactor pressure vessel containing fuel rods configured to heat a fluid to provide said high-pressure heated fluid and means for selectively conveying said compressed air from said tank to said fuel rods to absorb heat from said fuel rods in case said rods become overheated.

3. The thermal power plant of claim 2 where said means for selectively conveying said compressed air from said tank to said fuel rods comprises a valve that is configured to be openable and piping configured to convey and inject compressed air from said compressed-air tank into said reactor pressure vessel.

4. The thermal power plant of claim 1 wherein said source of said high-pressure heated fluid is selected from the group consisting of a fossil fuel or nuclear-powered boiler, a geothermal source, a gas turbine, a container of molten salt, and metal heated by solar power.

5. The thermal power plant of claim 1, further including an air compressor configured to charge said compressed air tank.

6. The thermal power plant of claim 5 wherein at least one of said compressed air tank and said compressor is located at a facility that is remote from said primary turbine, said primary generator, said secondary turbine, and said secondary generator.

7. The thermal power plant of claim 1 wherein said heat exchanger has a plurality of sealed enclosures, and further including an exhaust fluid conduit configured to convey said exhaust fluid through each of said enclosures of said heat exchanger, and a compressed air conduit also configured to convey said compressed air through each of said enclosures of said heat exchanger such that said exhaust fluid fills said enclosures of said heat exchanger and surrounds said compressed air conduit so that heat from said exhaust fluid is transferred to said compressed air.

8. The thermal power plant of claim 7 wherein said heat exchanger has an exhaust fluid input configured to receive said exhaust fluid from said primary turbine and an exhaust fluid output for exhausting said exhaust fluid from said heat exchanger, and a compressed air input configured to receive said compressed air and a compressed air output for allowing said compressed air to exit said heat exchanger.

9. A nuclear thermal power plant, comprising:
a nuclear reactor having a reactor pressure vessel containing fuel rods configured to heat a fluid to provide a source of a high-pressure heated fluid for driving a primary turbine,
a primary turbine configured to receive said high-pressure heated fluid and produce mechanical power configured to drive a primary electrical generator,
a primary electrical generator driven by said mechanical power from said primary turbine, said primary electrical generator configured to produce primary electrical power,
said primary turbine having an outlet configured to convey exhaust fluid from said primary turbine,
a compressed-air tank configured to hold a quantity of compressed air,
a secondary heat exchanger configured to receive compressed air from said compressed-air tank and at least some of said exhaust fluid from said primary turbine and configured to supply heat from said exhaust fluid to said compressed air,
a secondary turbine configured to receive said heated compressed air from said secondary heat exchanger and produce mechanical power from said heated compressed air as it expands in said secondary turbine,
a secondary electrical generator configured to receive said mechanical power from said secondary turbine and generate secondary electrical power, and
means for selectively conveying said compressed air from said compressed-air tank to said fuel rods of said reactor pressure vessel for cooling said fuel rods in case said fuel rods become overheated,
whereby additional power is supplied by said secondary generator, the amount of cooling water required to cool said exhaust fluid from said primary turbine is reduced and said fuel rods are configured to be cooled by a local source if they become overheated.

10. The nuclear thermal power plant of claim 9 wherein said means for selectively conveying said compressed air from said compressed-air tank to said fuel rods of said reactor pressure vessel comprises a valve that is configured to be openable opened and piping.

11. The nuclear thermal power plant of claim 9 wherein said compressed air tank is located at a facility that is remote from said primary turbine, said primary generator, said secondary turbine, and said secondary generator.

12. The nuclear thermal power plant of claim 9 wherein said secondary heat exchanger has a plurality of sealed enclosures, and further including an exhaust fluid conduit configured to convey said exhaust fluid through each of said enclosures of said heat exchanger, a compressed air conduit configured to convey said compressed air through each of said enclosures of said heat exchanger such that exhaust fluid fills said enclosures of said heat exchanger and surrounds said compressed air conduit so that heat from said exhaust fluid is transferred to said compressed air.

13. The thermal power plant of claim 12 wherein said secondary heat exchanger has an exhaust fluid input configured to receive said exhaust fluid from said primary turbine and an exhaust fluid output configured to exhaust said exhaust fluid from said heat exchanger, and a compressed air input configured to receive said compressed air and a compressed air output configured to allow said compressed air to exit said heat exchanger.

* * * * *